(12) United States Patent
Shi et al.

(10) Patent No.: US 11,637,729 B2
(45) Date of Patent: Apr. 25, 2023

(54) REFERENCE SIGNAL GENERATION METHOD, REFERENCE SIGNAL DETECTION METHOD, AND COMMUNICATIONS APPARATUS

(71) Applicant: HUAWEI TECHNOLOGIES CO., LTD., Shenzhen (CN)

(72) Inventors: Zhenyu Shi, Shanghai (CN); Yi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/511,916

(22) Filed: Oct. 27, 2021

(65) Prior Publication Data

US 2022/0052890 A1 Feb. 17, 2022

Related U.S. Application Data

(63) Continuation of application No. PCT/CN2020/083259, filed on Apr. 3, 2020.

(30) Foreign Application Priority Data

Apr. 28, 2019 (CN) .......................... 201910351359.6

(51) Int. Cl.
*H04L 27/26* (2006.01)
*H04L 5/00* (2006.01)

(52) U.S. Cl.
CPC ........ *H04L 27/2602* (2013.01); *H04L 5/0007* (2013.01); *H04L 5/0048* (2013.01)

(58) Field of Classification Search
CPC ............... H04L 27/2602; H04L 5/0007; H04L 5/0053; H04L 5/0048; H04L 27/2613;
(Continued)

(56) References Cited

U.S. PATENT DOCUMENTS 9,237,580 B2 1/2016 Han et al.
10,021,674 B2 7/2018 Han et al.
(Continued)

FOREIGN PATENT DOCUMENTS

CN 101616360 A 12/2009
CN 102437987 A 5/2012
(Continued)

OTHER PUBLICATIONS

Nokia, Nokia Shanghai Bell, on remaining issues of DM-RS for NR physical data channels. 3GPP TSG RAN WG1 #91, Reno, Nevada, USA, Nov. 27 Dec. 1, 2017, R1-1720895, 17 pages.
(Continued)

*Primary Examiner* — Khanh C Tran
(74) *Attorney, Agent, or Firm* — Rimon PC

(57) ABSTRACT

This application provides a reference signal generation method in which a terminal device or a network device generates a reference signal by using a pseudo-random sequence initial factor $c_{init}$ provided in the embodiments of this application. Compared with a solution in the current technology, the reference signal generation method can support a relatively large quantity of reference signal sequences, to better meet the requirements of different 5G scenarios. The reference signal generation method may include obtaining a reference signal sequence based on a pseudo-random sequence initial factor $c_{init}$, and mapping the sequence to one or more OFDM symbols. The pseudo-random sequence initial factor $c_{init}$ is related to a parameter d, $d=\max(\log_2(n_{ID,max}+1)-10,0)$ or $d=\max(\log_2(n_{ID,max}+1)-12,0)$, max represents that a larger value is selected from two values, and $n_{ID,max}$ represents a maximum value of a reference signal sequence ID.

20 Claims, 6 Drawing Sheets

(58) Field of Classification Search
CPC ............... H04L 27/26136; H04L 5/003; H04L 5/0005
See application file for complete search history.

(56) References Cited

U.S. PATENT DOCUMENTS

| | | | |
|---|---|---|---|
| 10,841,142 B1* | 11/2020 | Yoon | H04W 72/0413 |
| 11,502,886 B2* | 11/2022 | Lee | H04L 27/262 |
| 2009/0238064 A1* | 9/2009 | Lee | H04L 25/0226 370/208 |
| 2012/0140716 A1 | 6/2012 | Baldemair et al. | |
| 2013/0301452 A1* | 11/2013 | Yoon | H04J 13/0074 370/252 |
| 2017/0048718 A1* | 2/2017 | Kim | H04L 1/1861 |
| 2017/0288830 A1 | 10/2017 | Fischer | |
| 2018/0367358 A1 | 12/2018 | Baligh et al. | |
| 2019/0052442 A1 | 2/2019 | Kim et al. | |
| 2019/0116076 A1 | 4/2019 | Li et al. | |
| 2019/0357123 A1 | 11/2019 | Jha et al. | |
| 2021/0075660 A1* | 3/2021 | Yoon | H04L 5/0048 |

FOREIGN PATENT DOCUMENTS

| | | |
|---|---|---|
| CN | 102769593 A | 11/2012 |
| CN | 103703734 A | 4/2014 |
| CN | 105589506 A | 5/2016 |
| CN | 106961408 A | 7/2017 |
| CN | 108141427 A | 6/2018 |
| CN | 108347323 A | 7/2018 |
| KR | 20130087971 A | 8/2013 |
| WO | 2018137605 A1 | 8/2018 |
| WO | 2019018973 A1 | 1/2019 |
| WO | 2019070183 A1 | 4/2019 |

OTHER PUBLICATIONS

Catt, DL and UL Reference Signals for NR Positioning. 3GPP TSG RAN WG1 #96bis, Xi an, China, Apr. 8 12, 2019, R1-1905346, 27 pages.

3GPP TS 36.211 V15.5.0 (Mar. 2019), 3rd Generation Partnership Project; Technical Specification Group Radio Access Network; Evolved Universal Terrestrial Radio Access (E-UTRA); Physical channels and modulation(Release 15), 239 pages.

3GPP TS 38.211 V15.5.0 (Mar. 2019), 3rd Generation Partnership Project; Technical Specification Group Radio Access Network; NR; Physical channels and modulation(Release 15), 96 pages.

MediaTek Inc., Reference signal design for NR positioning. 3GPP TSG-RAN WG1 #96bis Meeting, Xi"an, China, Apr. 8-Apr. 12, 2019, R1-1904500, 24 pages.

* cited by examiner

REFERENCE SIGNAL GENERATION METHOD, REFERENCE SIGNAL DETECTION METHOD, AND COMMUNICATIONS APPARATUS

CROSS-REFERENCE TO RELATED APPLICATIONS

This application is a continuation of International Application No. PCT/CN2020/083259, filed on Apr. 3, 2020, which claims priority to Chinese Patent Application No. 201910351359.6, filed on Apr. 28, 2019. The disclosures of the aforementioned applications are hereby incorporated by reference in their entireties.

TECHNICAL FIELD

This application relates to the communications field, and more specifically, to a reference signal generation method, a reference signal detection method, and a communications apparatus.

BACKGROUND

With evolution of a 5th generation (5G) technology, more scenarios need to be considered, for example, scenarios such as unmanned aerial vehicles and the internet of things. Emergence of these scenarios proposes higher requirements on positioning indicators such as precision and a delay.

Currently, positioning technologies that are mainly used include an enhanced cell identification (enhanced cell-ID, E-CID) technology, an observed time difference of arrival (OTDOA) technology, and the like. The OTDOA is used as an example. For example, a terminal device may measure, based on reference signals sent by a plurality of network devices (including a primary base station and a secondary base station), a time difference of arrival (TDOA) of a reference signal from the secondary base station to the terminal device relative to a reference signal from the primary base station to the terminal device, and report a measurement result to a positioning management device. The positioning management device obtains a location of the terminal device based on a plurality of obtained measurement results.

The reference signal used for positioning may be formed by a random sequence. For example, a positioning reference signal (PRS) may be formed by a Gold-31 random sequence. To distinguish between different random sequences, different initial factors may be used to generate different random sequences.

Therefore, how to design a reference signal to meet requirements of various 5G scenarios is an urgent technical problem that currently needs to be resolved.

SUMMARY

This application provides a reference signal generation method, a reference signal detection method, and a communications apparatus, to support a relatively large quantity of reference signal sequences, and meet requirements of various 5G scenarios.

According to a first aspect, a reference signal generation method is provided. The method may be performed by a network device, or may be performed by a chip or an integrated circuit disposed in a network device. Alternatively, the method may be performed by a terminal device, or may be performed by a chip or an integrated circuit disposed in a terminal device. This is not limited in this application.

The method may include: obtaining a reference signal sequence based on a pseudo-random sequence initial factor $c_{init}$; and mapping the sequence to one or more orthogonal frequency-division multiplexing (OFDM) symbols, where the pseudo-random sequence initial factor $c_{init}$ is related to a parameter d, $$d = \max(\log_2(n_{ID,max}+1)-10, 0) \quad \text{or} \quad d = \max(\log_2(n_{ID,max}+1)-12, 0)$$

max represents that a larger value is selected from two values, and $n_{ID,max}$ represents a maximum value of a reference signal sequence ID.

Based on the foregoing technical solution, the network device or the terminal device may obtain the reference signal sequence based on the pseudo-random sequence initial factor $c_{init}$ provided in embodiments of this application. In addition, the parameter d related to the maximum value of the reference signal sequence index (index, ID) is introduced into a formula for generating the pseudo-random sequence initial factor $c_{init}$, so that more cells can be supported, and more actual requirements can be met. For example, a scenario in which a quantity of reference signal sequence IDs is greater than or equal to 1024 (in other words, the maximum value of the reference signal sequence ID may be greater than or equal to 1023) can be supported by introducing $d = \max(\log_2(n_{ID,max}30\ 1)-10, 0)$ For another example, a scenario in which a quantity of reference signal sequence IDs is greater than or equal to 4096 (in other words, the maximum value of the reference signal sequence ID may be greater than or equal to 4095) can be supported by introducing $d = \max(\log_2(n_{ID,max}+1)-12, 0)$.

With reference to the first aspect, in some implementations of the first aspect, $d = \max(\log_2(n_{ID,max}+1)-10, 0)$, and the pseudo-random sequence initial factor $c_{init}$ is obtained according to the following formula:

$$c_{init} = \left[ 2^{31-d} \left\lfloor \frac{n_{ID}}{1024} \right\rfloor + (2^{10}(N_{symb}^{slot} n_{s,f}^{\mu} + l + 1)(2(n_{ID} \bmod 1024) + 1) + (n_{ID} \bmod 1024)) \right] \bmod 2^{31}.$$

$N_{symb}^{slot}$ represents a quantity of OFDM symbols in a slot, $\lfloor \ \rfloor$ represents rounding down, $n_{s,f}^{\mu}$ represents an index of a slot in a frame, l represents an index of an OFDM symbol in a slot, $n_{ID}$ represents the reference signal sequence ID, μ represents a parameter related to a subcarrier spacing, and mod represents a modulo operation.

Based on the foregoing technical solution, the scenario in which a quantity of reference signal sequence IDs is greater than or equal to 1024 (in other words, the maximum value of the reference signal sequence ID may be greater than or equal to 1023) can be supported. In addition, when a quantity of reference signal sequence IDs is less than 1024 (in other words, the maximum value of the reference signal sequence ID is less than 1023), the foregoing formula is consistent with a formula, in a 5G new radio (new radio, NR) standard, used to generate a pseudo-random sequence initial factor $c_{init}$ used to obtain a channel state information reference signal (channel state information reference signal, CSI-RS) sequence. Therefore, based on an actual requirement, the reference signal sequence obtained based on the pseudo-random sequence initial factor $c_{init}$ provided in embodiments of this application may be reused as an NR CSI-RS sequence. In other words, in embodiments of this application, compatibility and reuse between a reference signal obtained in embodiments of this application and an NR CSI-RS can be supported.

With reference to the first aspect, in some implementations of the first aspect, $d=\max(\log_2(n_{ID,max}+1)-12,0)$, and the pseudo-random sequence initial factor $c_{init}$ is obtained according to either of the following formulas:

$$c_{init} = 2^{31-d}\left\lfloor \frac{n_{ID}}{1024} \right\rfloor +$$
$$2^{12}(N_{symb}^{slot}n_{s,f}^{\mu}+l+1)(2n_{ID}\bmod 2^{11-d-\mu}+1)+n_{ID}\bmod 4096; \text{ or}$$

$$c_{init} = 2^{31-d}\left\lfloor \frac{n_{ID}}{1024} \right\rfloor + 2^{13}(N_{symb}^{slot}n_{s,f}^{\mu}+l+1)(2n_{ID}\bmod 2^{10-d-\mu}+1)+$$
$$2(n_{ID}\bmod 4096)+N_{CP}.$$

A value of $N_{CP}$ represents whether a cyclic prefix CP is a normal CP or an extended CP, $N_{symb}^{slot}$ represents a quantity of OFDM symbols in a slot, $n_{s,f}^{\mu}$ represents an index of a slot in a frame, l represents an index of an OFDM symbol in a slot, $n_{ID}$ represents the reference signal sequence ID, μ represents a parameter related to a subcarrier spacing, and mod represents a modulo operation.

Based on the foregoing technical solution, the network device or the terminal device may obtain the reference signal sequence based on the pseudo-random sequence initial factor $c_{init}$ provided in embodiments of this application. In addition, in consideration of different subcarrier spacings, quantities of bits (bit) that need to be occupied by $(N_{symb}^{slot}n_{s,f}^{\mu}+l+1)$ may be different. Therefore, to prevent overflow, this application proposes to perform some processing on the formula. Therefore, the reference signal generation method provided in embodiments of this application can support sequence generation at different subcarrier spacings. In addition, the parameter d related to the maximum value of the reference signal sequence ID is introduced into the formula for generating the pseudo-random sequence initial factor $c_{init}$, so that the scenario in which a quantity of reference signal sequence IDs is greater than or equal to 4096 (in other words, the maximum value of the reference signal sequence ID may be greater than or equal to 4095) can be supported, and more actual requirements are met. In addition, impact of the cyclic prefix CP is also considered in the foregoing technical solution.

According to a second aspect, a reference signal generation method is provided. The method may be performed by a network device, or may be performed by a chip or a circuit disposed in a network device. Alternatively, the method may be performed by a terminal device, or may be performed by a chip or an integrated circuit disposed in a terminal device. This is not limited in this application.

The method may include: obtaining a reference signal sequence based on a pseudo-random sequence initial factor $c_{init}$; and mapping the sequence to one or more OFDM symbols, where the pseudo-random sequence initial factor $c_{init}$ is obtained according to either of the following formulas:

$$c_{init}=2^{12}(N_{symb}^{slot}n_{s,f}^{\mu}+l+1)(2n_{ID}\bmod 2^{11-\mu}+1)+n_{ID};$$
or $$c_{init}=2^{13}(N_{symb}^{slot}n_{s,f}^{\mu}+l+1)(2n_{ID}\bmod 2^{10-\mu}+1)+2n_{ID}+N_{CP}.$$

A value of $N_{CP}$ represents whether a cyclic prefix CP is a normal CP or an extended CP, $N_{symb}^{slot}$ represents a quantity of OFDM symbols in a slot, $n_{s,f}^{\mu}$ represents an index of a slot in a frame, l represents an index of an OFDM symbol in a slot, $n_{ID}$ represents a reference signal sequence ID, μ represents a parameter related to a subcarrier spacing, and mod represents a modulo operation.

Based on the foregoing technical solution, the network device or the terminal device may obtain the reference signal sequence based on the pseudo-random sequence initial factor $c_{init}$ provided in embodiments of this application. In addition, in consideration of different subcarrier spacings, quantities of bits (bit) that need to be occupied by $(N_{symb}^{slot}n_{s,f}^{\mu}+l+1)$ may be different. Therefore, to prevent overflow, this application proposes to perform some processing on the formula, for example, perform an operation of $\bmod 2^{11-\mu}$, to limit a quantity of occupied bits within 11−μ. Therefore, the foregoing technical solution can support sequence generation at different subcarrier spacings. In addition, impact of the cyclic prefix (CP) is also considered in the foregoing technical solution, so that compatibility with a long term evolution (LTE) system can be supported.

According to a third aspect, a reference signal generation method is provided. The method may be performed by a network device, or may be performed by a chip or a circuit disposed in a network device. Alternatively, the method may be performed by a terminal device, or may be performed by a chip or an integrated circuit disposed in a terminal device. This is not limited in this application.

The method may include: obtaining a reference signal sequence based on a pseudo-random sequence initial factor $c_{init}$; and mapping the sequence to one or more OFDM symbols, where the pseudo-random sequence initial factor $c_{init}$ is obtained according to either of the following formulas:

$$c_{init} = 2^{31-d}\left\lfloor \frac{n_{ID}}{1024} \right\rfloor +$$
$$2^{12}(N_{symb}^{slot}n_{s,f}^{\mu}+l+1)(2n_{ID}\bmod 2^{11-d-\mu}+1)+n_{ID}\bmod 4096; \text{ or}$$

$$c_{init} = 2^{31-d}\left\lfloor \frac{n_{ID}}{1024} \right\rfloor + 2^{13}(N_{symb}^{slot}n_{s,f}^{\mu}+l+1)(2n_{ID}\bmod 2^{10-d-\mu}+1)+$$
$$2(n_{ID}\bmod 4096)+N_{CP}.$$

$d=\max(\log_2(n_{ID,max}+1)-12,0)$, max represents that a larger value is selected from two values, $n_{ID,max}$ represents a maximum value of a reference signal sequence ID, a value of $N_{CP}$ represents whether a cyclic prefix CP is a normal CP or an extended CP, $N_{symb}^{slot}$ represents a quantity of OFDM symbols in a slot, $\lfloor\ \rfloor$ represents rounding down, $n_{s,f}^{\mu}$ represents an index of a slot in a frame, l represents an index of an OFDM symbol in a slot, $n_{ID}$ represents the reference signal sequence ID, μ represents a parameter related to a subcarrier spacing, and mod represents a modulo operation.

Based on the foregoing technical solution, the network device or the terminal device may obtain the reference signal sequence based on the pseudo-random sequence initial factor $c_{init}$ provided in embodiments of this application. In addition, in consideration of different subcarrier spacings, quantities of bits (bit) that need to be occupied by $(N_{symb}^{slot}n_{s,f}^{\mu}+l+1)$ may be different. Therefore, to prevent overflow, this application proposes to perform some processing on the formula. Therefore, the reference signal generation method provided in embodiments of this application can support sequence generation at different subcarrier spacings. In addition, the parameter d related to the maximum value of the reference signal sequence ID is introduced into the formula for generating the pseudo-random sequence initial factor $c_{init}$, so that a scenario in which a quantity of reference signal sequence IDs is greater than or equal to 4096 (in other words, the maximum value of the reference signal sequence ID may be greater than or equal to 4095) can be supported, and more actual requirements are met. In addition, impact of the cyclic prefix CP is also considered in the foregoing technical solution.

With reference to the third aspect, in some implementations of the third aspect, a quantity of reference signal sequence IDs is greater than or equal to 4096.

According to a fourth aspect, a reference signal generation method is provided. The method may be performed by a network device, or may be performed by a chip or a circuit disposed in a network device. Alternatively, the method may be performed by a terminal device, or may be performed by a chip or an integrated circuit disposed in a terminal device. This is not limited in this application.

The method may include: obtaining a reference signal sequence based on a pseudo-random sequence initial factor $c_{init}$; and mapping the sequence to one or more OFDM symbols, where the pseudo-random sequence initial factor $c_{init}$ is obtained according to either of the following formulas:

$$c_{init} = \left(2^{31-d}\left\lfloor\frac{n_{ID}}{4096}\right\rfloor + 2^{12}(N_{symb}^{slot}n_{s,f}^{\mu} + l + 1)(2n_{ID}\bmod 2^{11-\mu} + 1) + n_{ID}\bmod 4096\right)\bmod 2^{31};$$

or $$c_{init} = \left(2^{31-d}\left\lfloor\frac{n_{ID}}{4096}\right\rfloor + 2^{13}(N_{symb}^{slot}n_{s,f}^{\mu} + l + 1)(2n_{ID}\bmod 2^{10-\mu} + 1) + 2(n_{ID}\bmod 4096) + N_{CP}\right)\bmod 2^{31}.$$

$d=\max(\log_2(n_{ID,max}+1)-12,0)$, max represents that a larger value is selected from two values, $n_{ID,max}$ represents a maximum value of a reference signal sequence ID, a value of $N_{CP}$ represents whether a cyclic prefix CP is a normal CP or an extended CP, $N_{symb}^{slot}$ represents a quantity of OFDM symbols in a slot, $\lfloor\ \rfloor$ represents rounding down, $n_{s,f}^{\mu}$ represents an index of a slot in a frame, l represents an index of an OFDM symbol in a slot, $n_{ID}$ represents the reference signal sequence ID, μ represents a parameter related to a subcarrier spacing, and mod represents a modulo operation.

Based on the foregoing technical solution, the network device or the terminal device may obtain the reference signal sequence based on the pseudo-random sequence initial factor $c_{init}$ provided in embodiments of this application. In addition, in consideration of different subcarrier spacings, quantities of bits (bit) that need to be occupied by ($N_{symb}^{slot}n_{s,f}^{\mu}+l+1$) may be different. Therefore, to prevent overflow, this application proposes to perform some processing on the formula. Therefore, the reference signal generation method provided in embodiments of this application can support sequence generation at different subcarrier spacings. In addition, the parameter d related to the maximum value of the reference signal sequence ID is introduced into the formula for generating the pseudo-random sequence initial factor $c_{init}$, so that a scenario in which a quantity of reference signal sequence IDs is greater than or equal to 4096 (in other words, the maximum value of the reference signal sequence ID may be greater than or equal to 4095) can be supported, and more actual requirements are met. In addition, impact of the cyclic prefix CP is also considered in the foregoing technical solution.

With reference to the fourth aspect, in some implementations of the fourth aspect, a quantity of reference signal sequence IDs is greater than or equal to 4096.

In other words, the maximum value of the reference signal sequence ID may be greater than or equal to 4095.

According to a fifth aspect, a reference signal detection method is provided. The method may be performed by a terminal device, or may be performed by a chip or a circuit configured in a terminal device. This is not limited in this application.

The method may include: receiving a reference signal, to obtain a first sequence; obtaining a second sequence based on a pseudo-random sequence initial factor $c_{init}$; and performing correlation detection on the first sequence and the second sequence, where the pseudo-random sequence initial factor $c_{init}$ is related to a parameter d, $d=\max(\log_2(n_{ID,max}+1)-10,0)$ or $d=\max(\log_2(n_{ID,max}+1)-12,0)$, max represents that a larger value is selected from two values, and $n_{ID,max}$ represents a maximum value of a reference signal sequence ID.

Based on the foregoing technical solution, the terminal device may obtain a reference signal sequence based on the pseudo-random sequence initial factor $c_{init}$ provided in embodiments of this application. In addition, the parameter d related to the maximum value of the reference signal sequence ID is introduced into a formula for generating the pseudo-random sequence initial factor $c_{init}$, so that more reference signal sequence IDs can be supported, and more actual requirements can be met. For example, a scenario in which a quantity of reference signal sequence IDs is greater than or equal to 1024 (in other words, the maximum value of the reference signal sequence ID may be greater than or equal to 1023) can be supported by introducing $d=\max(\log_2(n_{ID,max}+1)-10,0)$. For another example, a scenario in which a quantity of reference signal sequence IDs is greater than or equal to 4096 (in other words, the maximum value of the reference signal sequence ID may be greater than or equal to 4095) can be supported by introducing $d=\max(\log_2(n_{ID,max}+1)-12,0)$.

With reference to the fifth aspect, in some implementations of the fifth aspect, $d=\max(\log_2(n_{ID,max}+1)-10,0)$, and the pseudo-random sequence initial factor $c_{init}$ is obtained according to the following formula:

$$c_{init} = \left[2^{31-d}\left\lfloor\frac{n_{ID}}{1024}\right\rfloor + (2^{10}(N_{symb}^{slot}n_{s,f}^{\mu} + l + 1)(2(n_{ID}\bmod 1024) + 1) + (n_{ID}\bmod 1024))\right]\bmod 2^{31}.$$

$N_{symb}^{slot}$ represents a quantity of OFDM symbols in a slot, $\lfloor\ \rfloor$ represents rounding down, $n_{s,f}^{\mu}$ represents an index of a slot in a frame, l represents an index of an OFDM symbol in a slot, $n_{ID}$ represents the reference signal sequence ID, μ represents a parameter related to a subcarrier spacing, and mod represents a modulo operation.

With reference to the fifth aspect, in some implementations of the fifth aspect, $d=\max(\log_2(n_{ID,max}+1)-12,0)$, and the pseudo-random sequence initial factor $c_{init}$ is obtained according to either of the following formulas:

$$c_{init} = 2^{31-d}\left\lfloor\frac{n_{ID}}{1024}\right\rfloor + 2^{12}(N_{symb}^{slot}n_{s,f}^{\mu} + l + 1)(2n_{ID}2^{11-d-\mu} + 1) + n_{ID}\bmod 4096;$$

-continued or $$c_{init} = 2^{31-d}\left\lfloor\frac{n_{ID}}{1024}\right\rfloor + \\ 2^{13}(N_{symb}^{slot}n_{s,f}^{\mu} + l + 1)(2n_{ID}2^{10-d-\mu} + 1) + 2(n_{ID}\bmod 4096) + N_{CP}.$$

A value of $N_{CP}$ represents whether a cyclic prefix CP is a normal CP or an extended CP, $N_{symb}^{slot}$ represents a quantity of OFDM symbols in a slot, $\lfloor\ \rfloor$ represents rounding down, $n_{s,f}^{\mu}$ represents an index of a slot in a frame, l represents an index of an OFDM symbol in a slot, $n_{ID}$ represents the reference signal sequence ID, $\mu$ represents a parameter related to a subcarrier spacing, and mod represents a modulo operation.

With reference to the fifth aspect, in some implementations of the fifth aspect, the method further includes: receiving information about the parameter $N_{CP}$ and/or information about the parameter $n_{ID}$ that are/is sent by a network device, where a value of $N_{CP}$ represents whether the cyclic prefix CP is a normal CP or an extended CP, and $n_{ID}$ represents the reference signal sequence ID.

With reference to the fifth aspect, in some implementations of the fifth aspect, the performing correlation detection on the first sequence and the second sequence includes: performing the correlation detection on the first sequence and the second sequence, to obtain one or more of the following measurement values: a time difference of arrival, a reference signal received quality, or a reference signal received power.

With reference to the fifth aspect, in some implementations of the fifth aspect, the reference signal is a positioning reference signal PRS.

According to a sixth aspect, a reference signal detection method is provided. The method may be performed by a terminal device, or may be performed by a chip or a circuit configured in a terminal device. This is not limited in this application.

The method may include: receiving a reference signal, to obtain a first sequence; obtaining a second sequence based on a pseudo-random sequence initial factor $c_{init}$; and performing correlation detection on the first sequence and the second sequence, where the pseudo-random sequence initial factor $c_{init}$ is obtained according to either of the following formulas:

$$c_{init} = 2^{12}(N_{symb}^{slot}n_{s,f}^{\mu}+l+1)(2n_{ID}\bmod 2^{11-\mu}+1)+n_{ID};$$

or $$c_{init} = 2^{13}(N_{symb}^{slot}n_{s,f}^{\mu}+l+1)(2n_{ID}\bmod 2^{10-\mu}+1)+2n_{ID}+N_{CP}.$$

A value of $N_{CP}$ represents whether a cyclic prefix CP is a normal CP or an extended CP, $N_{symb}^{slot}$ represents a quantity of OFDM symbols in a slot, $n_{s,f}^{\mu}$ represents an index of a slot in a frame, l represents an index of an OFDM symbol in a slot, $n_{ID}$ represents a reference signal sequence ID, $\mu$ represents a parameter related to a subcarrier spacing, and mod represents a modulo operation.

Based on the foregoing technical solution, the terminal device may obtain a reference signal sequence based on a pseudo-random sequence initial factor $c_{init}$ provided in embodiments of this application. In addition, in consideration of different subcarrier spacings, quantities of bits (bit) that need to be occupied by $(N_{symb}^{slot}n_{s,f}^{\mu}+l+1)$ may be different. Therefore, to prevent overflow, this application proposes to perform some processing on the formula, for example, perform an operation of $\bmod 2^{11-\mu}$, to limit a quantity of occupied bits within $11-\mu$. Therefore, the foregoing technical solution can support sequence generation at different subcarrier spacings. In addition, impact of the CP is also considered in the foregoing technical solution, so that compatibility with an LTE system can be supported.

With reference to the sixth aspect, in some implementations of the sixth aspect, the method further includes: receiving information about the parameter $N_{CP}$ and/or information about the parameter $n_{ID}$ that are/is sent by a network device, where a value of $N_{CP}$ represents whether the cyclic prefix CP is a normal CP or an extended CP, and $n_{ID}$ represents the reference signal sequence ID.

With reference to the sixth aspect, in some implementations of the sixth aspect, the performing correlation detection on the first sequence and the second sequence includes: performing the correlation detection on the first sequence and the second sequence, to obtain one or more of the following measurement values: a time difference of arrival, a reference signal received quality, or a reference signal received power.

With reference to the sixth aspect, in some implementations of the sixth aspect, the reference signal is a positioning reference signal PRS.

According to a seventh aspect, a reference signal detection method is provided. The method may be performed by a terminal device, or may be performed by a chip or a circuit configured in a terminal device. This is not limited in this application.

The method may include: receiving a reference signal, to obtain a first sequence; obtaining a second sequence based on a pseudo-random sequence initial factor $c_{init}$; and performing correlation detection on the first sequence and the second sequence, where the pseudo-random sequence initial factor $c_{init}$ is obtained according to either of the following formulas:

$$c_{init} = \\ 2^{31-d}\left\lfloor\frac{n_{ID}}{1024}\right\rfloor + 2^{12}(N_{symb}^{slot}n_{s,f}^{\mu}+l+1)(2n_{ID}2^{11-d-\mu}+1)+n_{ID}\bmod 4096;$$

or $$c_{init} = 2^{31-d}\left\lfloor\frac{n_{ID}}{1024}\right\rfloor + \\ 2^{13}(N_{symb}^{slot}n_{s,f}^{\mu}+l+1)(2n_{ID}2^{10-d-\mu}+1)+2(n_{ID}\bmod 4096)+N_{CP}.$$

$d=\max(\log_2(n_{ID,max}+1)-12,0)$, max represents that a larger value is selected from two values, $n_{ID,max}$ represents a maximum value of a reference signal sequence ID, a value of $N_{CP}$ represents whether a cyclic prefix CP is a normal CP or an extended CP, $N_{symb}^{slot}$ represents a quantity of OFDM symbols in a slot, $n_{s,f}^{\mu}$ represents an index of a slot in a frame, l represents an index of an OFDM symbol in a slot, $n_{ID}$ represents the reference signal sequence ID, $\mu$ represents a parameter related to a subcarrier spacing, and mod represents a modulo operation.

Based on the foregoing technical solution, the terminal device may obtain a reference signal sequence based on a pseudo-random sequence initial factor $c_{init}$ provided in embodiments of this application. In addition, in consideration of different subcarrier spacings, quantities of bits (bit) that need to be occupied by $(N_{symb}^{slot}n_{s,f}^{\mu}+l+1)$ may be different. Therefore, to prevent overflow, this application proposes to perform some processing on the formula. Therefore, the reference signal generation method provided in embodiments of this application can support sequence generation at different subcarrier spacings. In addition, the parameter d related to the maximum value of the reference signal sequence ID is introduced into the formula for generating the pseudo-random sequence initial factor $c_{init}$, so that a scenario in which a quantity of reference signal sequence IDs is greater than or equal to 4096 can be supported, and more actual requirements are met. In addition, impact of the cyclic prefix CP is also considered in the foregoing technical solution.

With reference to the seventh aspect, in some implementations of the seventh aspect, a quantity of reference signal sequence IDs is greater than or equal to 4096.

In other words, the maximum value of the reference signal sequence ID may be greater than or equal to 4095.

With reference to the seventh aspect, in some implementations of the seventh aspect, the method further includes: receiving information about the parameter $N_{CP}$ and/or information about the parameter $n_{ID}$ that are/is sent by a network device, where a value of $N_{CP}$ represents whether the cyclic prefix CP is a normal CP or an extended CP, and $n_{ID}$ represents the reference signal sequence ID.

With reference to the seventh aspect, in some implementations of the seventh aspect, the performing correlation detection on the first sequence and the second sequence includes: performing the correlation detection on the first sequence and the second sequence, to obtain one or more of the following measurement values: a time difference of arrival, a reference signal received quality, or a reference signal received power.

With reference to the seventh aspect, in some implementations of the seventh aspect, the reference signal is a positioning reference signal PRS.

According to an eighth aspect, a reference signal detection method is provided. The method may be performed by a terminal device, or may be performed by a chip or a circuit configured in a terminal device. This is not limited in this application.

The method may include: receiving a reference signal, to obtain a first sequence; obtaining a second sequence based on a pseudo-random sequence initial factor $c_{init}$; and performing correlation detection on the first sequence and the second sequence, where the pseudo-random sequence initial factor $c_{init}$ is obtained according to either of the following formulas:

$$c_{init} = \left(2^{31-d}\left\lfloor\frac{n_{ID}}{4096}\right\rfloor + 2^{12}(N_{symb}^{slot}n_{s,f}^{\mu} + l + 1)(2n_{ID}\bmod 2^{11-\mu} + 1) + n_{ID}\bmod 4096\right) \bmod 2^{31};$$

or $$c_{init} = \left(2^{31-d}\left\lfloor\frac{n_{ID}}{4096}\right\rfloor + 2^{13}(N_{symb}^{slot}n_{s,f}^{\mu} + l + 1)(2n_{ID}\bmod 12^{10-\mu} + 1) + 2(n_{ID}\bmod 4096) + N_{CP}\right)\bmod 2^{31}.$$

$d = \max(\log_2(n_{ID,max}+1)-12, 0)$, max represents that a larger value is selected from two values, $n_{ID,max}$ represents a maximum value of a reference signal sequence ID, a value of $N_{CP}$ represents whether a cyclic prefix CP is a normal CP or an extended CP, $N_{symb}^{slot}$ represents a quantity of OFDM symbols in a slot, $\lfloor\ \rfloor$ represents rounding down, $n_{s,f}^{\mu}$ represents an index of a slot in a frame, l represents an index of an OFDM symbol in a slot, $n_{ID}$ represents the reference signal sequence ID, μ represents a parameter related to a subcarrier spacing, and mod represents a modulo operation.

Based on the foregoing technical solution, the terminal device may obtain a reference signal sequence based on a pseudo-random sequence initial factor $c_{init}$ provided in embodiments of this application. In addition, in consideration of different subcarrier spacings, quantities of bits (bit) that need to be occupied by $(N_{symb}^{slot}n_{s,f}^{\mu}+l+1)$ may be different. Therefore, to prevent overflow, this application proposes to perform some processing on the formula. Therefore, the reference signal generation method provided in embodiments of this application can support sequence generation at different subcarrier spacings. In addition, the parameter d related to the maximum value of the reference signal sequence ID is introduced into the formula for generating the pseudo-random sequence initial factor $c_{init}$, so that a scenario in which a quantity of reference signal sequence IDs is greater than or equal to 4096 (in other words, the maximum value of the reference signal sequence ID may be greater than or equal to 4095) can be supported, and more actual requirements are met. In addition, impact of the cyclic prefix CP is also considered in the foregoing technical solution.

With reference to the eighth aspect, in some implementations of the eighth aspect, a quantity of reference signal sequence IDs is greater than or equal to 4096.

With reference to the eighth aspect, in some implementations of the eighth aspect, the method further includes: receiving information about the parameter $N_{CP}$ and/or information about the parameter $n_{ID}$ that are/is sent by a network device, where a value of $N_{CP}$ represents whether the cyclic prefix CP is a normal CP or an extended CP, and $n_{ID}$ represents the reference signal sequence ID.

With reference to the eighth aspect, in some implementations of the eighth aspect, the performing correlation detection on the first sequence and the second sequence includes: performing the correlation detection on the first sequence and the second sequence, to obtain one or more of the following measurement values: a time difference of arrival, a reference signal received quality, or a reference signal received power.

With reference to the eighth aspect, in some implementations of the eighth aspect, the reference signal is a positioning reference signal PRS.

According to a ninth aspect, a communications apparatus is provided. The communications apparatus is configured to perform the methods according to the first aspect to the fourth aspect. Specifically, the communications apparatus may include a module configured to perform the methods according to the first aspect to the fourth aspect.

According to a tenth aspect, a communications apparatus is provided. The communications apparatus is configured to perform the methods according to the fifth aspect to the eighth aspect. Specifically, the communications apparatus may include a module configured to perform the methods according to the fifth aspect to the eighth aspect.

According to an eleventh aspect, a communications apparatus is provided. The communications apparatus includes a memory and a processor, the memory is configured to store an instruction, the processor is configured to execute the instruction stored in the memory, and the execution of the instruction stored in the memory enables the communications apparatus to perform the methods according to the first aspect to the fourth aspect.

According to a twelfth aspect, a communications apparatus is provided. The communications apparatus includes a memory and a processor, the memory is configured to store an instruction, the processor is configured to execute the instruction stored in the memory, and the execution of the instruction stored in the memory enables the communications apparatus to perform the methods according to the fifth aspect to the eighth aspect.

According to a thirteenth aspect, a chip is provided. The chip includes a processing module and a communications interface, the processing module is configured to control the communications interface to communicate with the outside, and the processing module is further configured to implement the methods according to the first aspect to the fourth aspect.

According to a fourteenth aspect, a chip is provided. The chip includes a processing module and a communications interface, the processing module is configured to control the communications interface to communicate with the outside, and the processing module is further configured to implement the methods according to the fifth aspect to the eighth aspect.

According to a fifteenth aspect, a computer-readable storage medium is provided. The computer-readable storage medium stores a computer program; and when the computer program is executed by a communications apparatus, the communications apparatus is enabled to implement the method according to any one of the first aspect to the fourth aspect, and the possible implementations of the first aspect to the fourth aspect.

According to a sixteenth aspect, a computer-readable storage medium is provided. The computer-readable storage medium stores a computer program; and when the computer program is executed by a communications apparatus, the communications apparatus is enabled to implement the method according to any one of the fifth aspect to the eighth aspect, and the possible implementations of the fifth aspect to the eighth aspect.

According to a seventeenth aspect, a computer program product including an instruction is provided. When the instruction is executed by a computer, a communications apparatus is enabled to implement the methods according to the first aspect to the fourth aspect.

According to an eighteenth aspect, a computer program product including an instruction is provided. When the instruction is executed by a computer, a communications apparatus is enabled to implement the methods according to the fifth aspect to the eighth aspect.

Based on the embodiments of this application, the pseudo-random sequence initial factor $c_{init}$ may be used more flexibly. For example, the provided pseudo-random sequence initial factor $c_{init}$ may be used to implement compatibility and reuse between an NR PRS and an NR CSI-RS; or the provided pseudo-random sequence initial factor $c_{init}$ can support the scenario in which a quantity of reference signal sequence IDs is greater than or equal to 4096 (in other words, the maximum value of the reference signal sequence ID may be greater than or equal to 4095); or the provided pseudo-random sequence initial factor $c_{init}$ can support cases of different designs at different subcarrier spacings; or the provided pseudo-random sequence initial factor $c_{init}$ can support cases of different CP types. Therefore, based on the embodiments of this application, different pseudo-random sequence initial factors $c_{init}$ may be selected based on actual requirements.

DETAILED DESCRIPTION OF EMBODIMENTS

Figure 1:
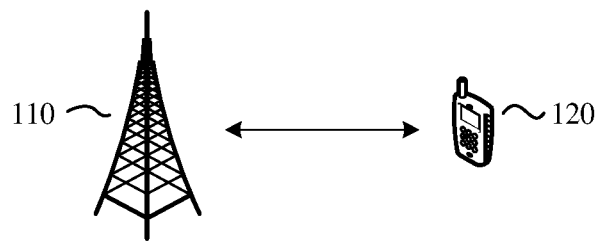
FIG. 1 and FIG. 2 each are a schematic diagram of a communications system for which embodiments of this application are used.

The following describes technical solutions of this application with reference to the accompanying drawings.

The technical solutions of embodiments of this application may be used for various communications systems, for example, a long term evolution (LTE) system, an LTE frequency division duplex (FDD) system, an LTE time division duplex (TDD) system, a universal mobile telecommunications system (UMTS), a 5th generation (5G) system, a new radio (NR) system, and another evolved communications system.

A terminal device in the embodiments of this application may also be referred to as user equipment (UE), a mobile station (MS), a mobile terminal (MT), an access terminal, a subscriber unit, a subscriber station, a mobile console, a mobile station, a remote station, a remote terminal, a mobile device, a user terminal, a terminal, a wireless communications device, a user agent, or a user apparatus.

The terminal device may be a device that provides a user with voice/data connectivity, for example, a handheld device or a vehicle-mounted device having a wireless connection function. Currently, for example, the terminal device may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, or a terminal device in a future evolved public land mobile network (PLMN). This is not limited in the embodiments of this application.

By way of example and not limitation, in embodiments of this application, the terminal device may alternatively be a wearable device. The wearable device may also be referred to as a wearable intelligent device, and is a general term for wearable devices, such as glasses, gloves, watches, clothes, and shoes that are developed by applying wearable technologies in intelligent designs of daily wear. The wearable device is a portable device that can be directly worn by a user or integrated into clothes or an accessory of a user. The wearable device is not only a hardware device, but also implements powerful functions through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, for example, various smart bands or smart jewelry for monitoring physical signs.

In addition, the terminal device in the embodiments of this application may alternatively be a terminal device in an internet of things (IoT) system. The IoT is an important part of future development of information technologies. A main technical feature of the IoT is connecting a thing to a network by using a communications technology, to implement an intelligent network for interconnection between a person and a machine or between one thing and another.

In addition, a network device in embodiments of this application may be a device used to communicate with a terminal device. The network device may also be referred to as an access network device or a wireless access network device, and may be a transmission reception point (TRP), an evolved NodeB (eNB or eNodeB) in an LTE system, a home base station (for example, a home evolved NodeB or a home NodeB, HNB), a baseband unit (BBU), or a wireless controller in a cloud radio access network (CRAN) scenario. Alternatively, the network device may be a relay station, an access point, a vehicle-mounted device, a wearable device, a network device in a 5G network, a network device in a future evolved PLMN network, or the like; or may be an access point (AP) in a WLAN or a gNB in a new radio (NR) system. This is not limited in embodiments of this application.

In a network structure, the network device may include a centralized unit (CU) node, a distributed unit (DU) node, a RAN device including a CU node and a DU node, or a RAN device including a control plane CU node (a CU-CP node), a user plane CU node (a CU-UP node), and a DU node.

The network device provides a cell with a service, and the terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, and the like. These small cells are characterized by small coverage and a low transmit power, and are applicable to providing a high-rate data transmission service.

For ease of understanding the embodiments of this application, communications systems applicable to the embodiments of this application are described in detail with reference to FIG. 1 and FIG. 2.

FIG. 1 is a schematic diagram of a communications system 100 applicable to some embodiments of this application. As shown in the figure, the communications system 100 may include at least one network device such as a network device 110 shown in FIG. 1. The communications system 100 may further include at least one terminal device such as a terminal device 120 shown in FIG. 1. The network device 110 and the terminal device 120 may communicate with each other through a wireless link.

Figure 2:
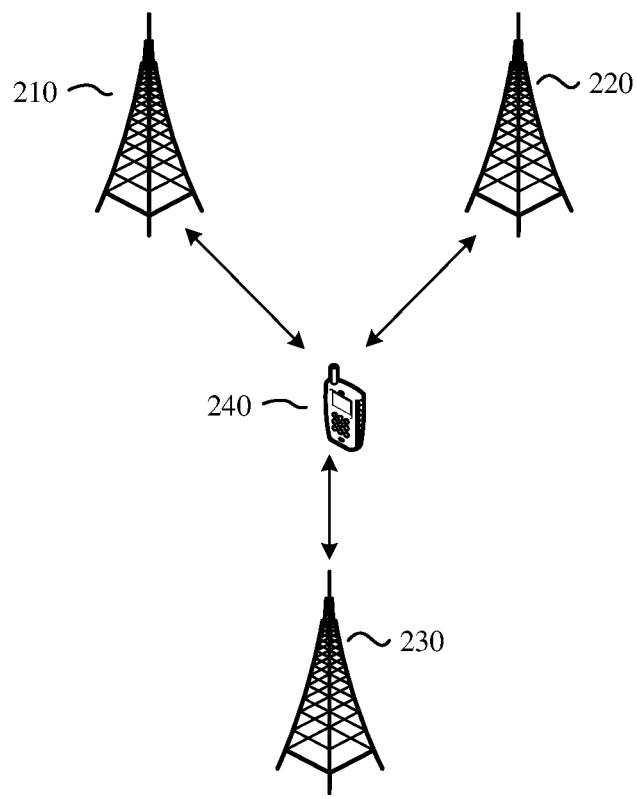

FIG. 2 is another schematic diagram of a communications system 200 applicable to embodiments of this application. As shown in the figure, the communications system 200 may include a plurality of network devices such as network devices 210, 220, and 230 shown in FIG. 2. The communications system 200 may further include at least one terminal device such as a terminal device 240 shown in FIG. 2. The terminal device 240 may establish radio links to the network device 210, the network device 220, and the network device 230 by using a multi-connectivity technology. The network device 210 may be, for example, a primary base station, and the network device 220 and the network device 230 may be, for example, secondary base stations. In this case, the network device 210 is a network device used when the terminal device 240 performs initial access, and is responsible for radio resource control (RRC) communication with the terminal device 240. The network device 220 and the network device 230 may be added during RRC reconfiguration, and are configured to provide additional radio resources.

In addition, as shown in FIG. 2, among the three network devices, there may be one network device, for example, the network device 210, responsible for exchanging a radio resource control message with the terminal device and responsible for interacting with a core network control plane entity. In this case, the network device 210 may be referred to as a master node (MN). For example, the master node may be an MeNB or an MgNB, and is not limited thereto. The other two network devices, for example, the network device 220 and the network device 230, may be referred to as secondary nodes (SN). For example, the secondary node may be an SeNB or an SgNB, and is not limited thereto. A plurality of serving cells of the master node may form a master cell group (MCG), including one primary cell (PCell) and one or more optional serving cells (SCells). A plurality of serving cells of the secondary node may form a secondary cell group (SCG), including one primary secondary cell (PSCell) and one or more optional SCells. The serving cell is a cell that is configured by a network for the terminal device to perform uplink and downlink transmission.

Similarly, the terminal device may alternatively have communication connections to more network devices at the same time and may receive and send data. In the plurality of network devices, there may be one network device responsible for exchanging a radio resource control message with the terminal device and responsible for interacting with a core network control plane entity. In this case, the network device may be referred to as an MN, and other network devices may be referred to as SNs.

Certainly, the network device 220 may alternatively be a primary base station or a master node, and the network device 210 and the network device 230 are secondary base stations or secondary nodes; or the network device 230 is a primary base station or a master node, and the network device 210 and the network device 220 are secondary base stations or secondary nodes. This is not limited in this application. In addition, for ease of understanding, the figure shows only a case of wireless connections between three network devices and a terminal device. However, this should not constitute any limitation on a scenario to which this application is applicable. The terminal device may alternatively establish radio links with more network devices, or the terminal device may alternatively establish radio links with fewer network devices.

A plurality of antennas may be configured for each communications device such as the network device 110 or the terminal device 120 in FIG. 1, or the network device 210, the network device 220, the network device 230, or the terminal device 240 in FIG. 2. The plurality of antennas may include at least one transmit antenna configured to send a signal and at least one receive antenna configured to receive a signal. In addition, each communications device additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device and the terminal device may communicate with each other by using a multi-antenna technology.

In addition, the communications system 200 shown in FIG. 2 may be used in a positioning system. For example, when a location of a terminal device needs to be determined, a plurality of network devices (including a primary base station and a secondary base station, or including a master node and a secondary node) send, to the terminal device, reference signals (for example, positioning reference signals (PRS)) used to measure a time difference of arrival (TDOA) from the network devices to the terminal device, and then measurement data is reported to a positioning center, to determine the location of the terminal device.

Positioning is an important feature of wireless communication in the 3rd generation partnership project (3GPP). In some scenarios, for example, in an open outdoor scenario, a global positioning system (GPS) may be used for positioning. For example, a terminal device determines a location of the terminal device by using the GPS, and then reports a GPS positioning result to a network device, so that the network device obtains the location of the terminal device based on the GPS positioning result reported by the terminal device. In some scenarios, for example, in an indoor area or a complex urban area, a current positioning effect of the GPS is unsatisfactory. In this case, sites need to be deployed in these scenarios to obtain more lines of sight, so as to achieve a positioning effect better than that of the GPS. In addition, with evolution of a 5G technology, more scenarios also need to be considered, for example, scenarios such as unmanned aerial vehicles and the internet of things. Emergence of these scenarios also proposes higher requirements on positioning indicators such as precision and a delay.

Currently, positioning technologies that are mainly used include an enhanced cell identification (enhanced cell-ID, E-CID) technology, an observed time difference of arrival (OTDOA) technology, and the like. The OTDOA is used as an example to describe an implementation. In a possible implementation, a terminal device measures, based on reference signals sent by a plurality of network devices (including a primary base station and a secondary base station, or including a master node and a secondary node), a time difference of arrival of a reference signal from the secondary base station or the secondary node to the terminal device relative to a reference signal from the primary base station or the master node to the terminal device. For example, the time difference of arrival is denoted as a TDOA. A positioning management device obtains a location of the terminal device based on a plurality of obtained TODAs measured by the network device.

Currently, according to a standard definition, a downlink TDOA may be measured based on reference signals. For example, the reference signal may be a PRS, a sounding reference signal (SRS), or a channel state information reference signal (CSI-RS).

The PRS is used as an example. The PRS may be formed by a random sequence, for example, may be formed by a Gold-31 random sequence. Alternatively, it may be understood as that the PRS may use a random sequence. Therefore, the PRS may also be referred to as a PRS sequence. In embodiments of this application, terms "PRS" and "PRS sequence" are used alternatively, but a person skilled in the art may understand that meanings expressed by the terms are consistent when differences between the terms are not emphasized.

To distinguish between different PRS sequences, different initial factors may be used to generate the different PRS sequences. Through control of random initial factors, PRS sequences of different cells on different symbols (for example, orthogonal frequency division multiplexing (orthogonal frequency divided multiplexing, OFDM) symbols) may be different.

An expression of the PRS sequence is shown in a formula 1:

$$r_{l,n_s}(m) = \frac{1}{\sqrt{2}}(1-2c(2m)) + j\frac{1}{\sqrt{2}}(1-2c(2m+1)) \quad \text{Formula 1}$$

$$m = 1 - 2c2m + j1 - 2c2m + 1$$

$n_s$ represents an index of a slot in a frame, l represents an index of an OFDM symbol in a slot, m represents an index of a carrier in OFDM, c(i) represents a pseudo-random (pseudo-noise, PN) sequence defined by an initial factor $c_{init}$, and j is an imaginary part.

The initial factor $c_{init}$ may be further obtained according to the following formula 2:

$$c_{init} = 2^{28}\lfloor N_{ID}^{PRS}/512\rfloor + 2^{10}(7(n_s+1)+l+1)(2(N_{ID}^{PRS} \bmod 512)+1) + 2(N_{ID}^{PRS} \bmod 512) + N_{CP} \quad \text{Formula 2}$$

$N_{ID}^{PRS}$ represents a quantity of PRS IDs, and a value range of $N_{ID}^{PRS}$ may be: $N_{ID}^{PRS} \in \{0, 1, \ldots, 4095\}$; and a value of $N_{CP}$ represents whether a cyclic prefix (cyclic prefix, CP) is a normal (normal) CP or an extended (extended) CP.

Figure 3:
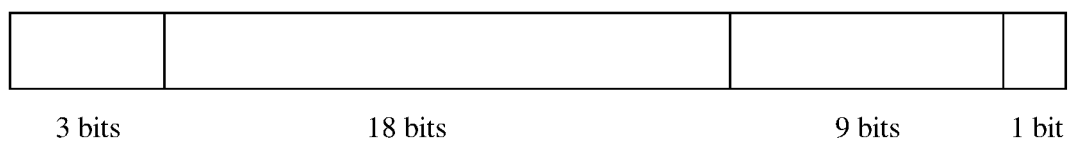
FIG. 3 is a schematic diagram of a possible bit mapping manner of $c_{init}$ of an existing PRS sequence.

It can be learned from the foregoing formula 2 that a value range of $c_{init}$ may be affected by value ranges of four variables: $N_{ID}^{PRS}$, $n_s$, l, and $N_{CP}$. The initial factor $c_{init}$ may be represented by using 31 bits (bit). FIG. 3 shows a possible bit mapping manner.

As shown in FIG. 3, 1 least significant bit is used to represent a CP type, and 9 bits are used to represent $N_{ID}^{PRS}$ mod 512. If a value range of $N_{ID}^{PRS}$ is $\{0, 1, \ldots, 4095\}$, 12 bits are required to represent the entire value range. Therefore, 3 most significant bits are used to represent $N_{ID}^{PRS}/512$, and 18 remaining bits in the middle are used to represent different values of $(7(n_s+1)+l+1)(2(N_{ID}^{PRS} \bmod 512)+1)$.

The formula 2 is for a case in which a subcarrier spacing is 15 kHz. In other words, when a subcarrier spacing is 15 kHz, $(2(N_{ID}^{PRS} \bmod 512)+1)$ uses 10 bits; and when a subcarrier spacing is 15 kHz, one frame includes 10 slots, and therefore a maximum value of $(7(n_s+1)+l+1)$ may be 7×10=70, and 7 bits are required. Therefore, at least 17 bits are required to transverse the entire value range, and the allocated 18 bits are sufficient.

However, for different subcarrier spacings, quantities of slots in one frame may be the same or may be different. For example, when a subcarrier spacing is 120 kHz, one frame includes 80 slots. In this case, a maximum value of (7($n_s$30 1)+l+1) may be 7*80=560, so that 10 bits are required. In this case, a total quantity of bits is 20, which exceeds a quantity of bits that can be currently allocated.

In view of this, embodiments of this application provide a method, to provide a plurality of more proper initial factor design solutions. The method can not only meet different requirements, for example, support a plurality of subcarrier spacings, or support a quantity of reference signal sequence IDs greater than or equal to 4096, but also can be flexibly used, to better meet requirements of various 5G scenarios.

The following describes in detail embodiments provided in this application with reference to the accompanying drawings.

Figure 4:
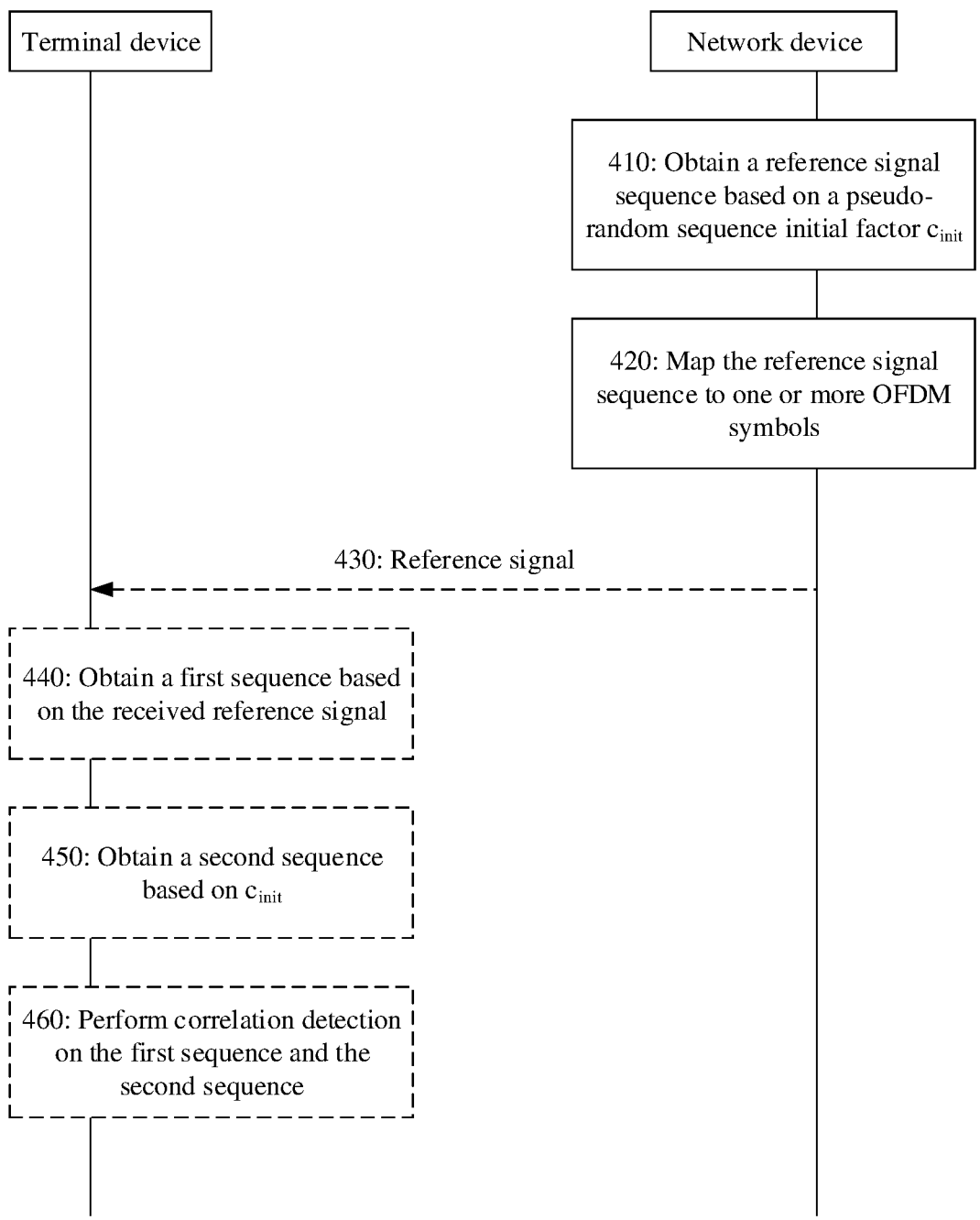
FIG. 4 is a schematic interaction diagram of a reference signal generation method according to embodiments of this application.

FIG. 4 is a schematic interaction diagram of a method 400 according to embodiments of this application. The method 400 may include the following steps.

410: A network device obtains a reference signal sequence based on a pseudo-random sequence initial factor $c_{init}$.

Optionally, the network device may obtain the reference signal sequence based on $c_{init}$ with reference to the foregoing formula 1. The following describes in detail a manner of obtaining $c_{init}$.

A reference signal may be used for channel measurement, channel estimation, or the like. For example, the reference signal includes but is not limited to: a PRS, a channel state information reference signal (CSI-RS), a cell reference signal (CRS), a fine synchronization signal (time/frequency tracking reference signal, TRS), a synchronization signal block (SSB), a sounding reference signal (SRS), or a demodulation reference signal (DMRS).

It should be understood that the reference signals listed above are merely examples for description, and shall not constitute any limitation on this application. This application does not exclude a possibility of defining another reference signal in a future protocol to implement a same or similar function.

It should be further understood that a specific type of the reference signal is not limited in this application. For example, the reference signal mentioned in the embodiments of this application may be replaced with a PRS. In other words, an expression manner that is of an initial factor and that is mentioned below may be used to generate a PRS.

420: The network device maps the reference signal sequence to one or more OFDM symbols.

In other words, the network device may map the reference signal sequence to a corresponding time-frequency resource, to send a reference signal to a terminal device.

A specific mapping manner is not limited in embodiments of this application. For example, for the mapping manner, refer to the current technology. Details are not described herein.

Optionally, the method 400 may further include 430 to 460.

430: The network device sends the reference signal to the terminal device. Correspondingly, the terminal device receives the reference signal.

After receiving the reference signal, the terminal device may perform corresponding processing.

Whether the terminal device processes the received reference signal or how the terminal device processes the reference signal is not limited in embodiments of this application. For example, the terminal device may perform the following steps 440 to 460.

440: The terminal device obtains a first sequence based on the received reference signal.

For example, the terminal device may demodulate the reference signal to obtain a sequence. For differentiation, the sequence is denoted as the first sequence. It should be understood that the first sequence is named only for differentiation, and does not constitute any limitation on the protection scope of embodiments of this application.

450: The terminal device obtains a second sequence based on an initial factor $c_{init}$.

Optionally, the terminal device may obtain a sequence based on the initial factor $c_{init}$ with reference to the foregoing formula 1. For differentiation, the sequence is denoted as the second sequence. It should be understood that the second sequence is named only for differentiation, and does not constitute any limitation on the protection scope of the embodiments of this application.

A manner of obtaining the initial factor $c_{init}$ used by the terminal device to obtain the second sequence is similar to the manner of obtaining the initial factor $c_{init}$ in step 410, and details are described below.

Optionally, the method 400 may further include: The terminal device receives parameter information that is sent by the network device and that may be used to obtain the second sequence. For example, the parameter information includes but is not limited to: information about $N_{CP}$ and/or information about $n_{ID}$. After receiving the parameter information, the terminal device may use the foregoing formula 1 and substitute the parameter into the foregoing formula 1, to obtain the second sequence.

A value of $N_{CP}$ represents whether a CP is a normal CP or an extended CP, and $n_{ID}$ is used to represent a reference signal sequence ID.

460: The terminal device performs correlation detection on the first sequence and the second sequence.

The terminal device may perform different processing based on different purposes. For example, the terminal device performs the correlation detection on the first sequence and the second sequence, to obtain a corresponding measurement value. The measurement value may include but is not limited to a delay, a power, a signal quality, or the like.

For example, the reference signal may include a PRS, and that the terminal device performs correlation detection on the first sequence and the second sequence may include: The terminal device measures a relative delay TDOA from network devices to the terminal device based on the received PRS. Further, the terminal device may report measurement data to a positioning management device, so that the positioning management device determines a location of the terminal device based on the reported measurement data.

For example, the reference signal may also be used as a measurement signal, and that the terminal device performs correlation detection on the first sequence and the second sequence may include: The terminal device measures a reference signal received power (RSRP), a reference signal received quality (RSRQ), and/or the like.

For example, the reference signal may also include a demodulation reference signal, and that the terminal device performs corresponding processing based on the reference signal may include: The terminal device demodulates data based on the demodulation reference signal.

It should be understood that the foregoing is merely an example for description, and embodiments of this application is not limited thereto.

The following describes manners of obtaining the initial factor $c_{init}$ in step 410 or step 450.

In embodiments of this application, the terminal device or the network device may obtain $c_{init}$ by using any one of the following seven solutions.

Solution 1

$c_{init}$ may be obtained according to the following formula 3:

$$c_{init} = \left[2^{31-d}\left\lfloor\frac{n_{ID}}{1024}\right\rfloor + \right.$$
$$(2^{10}(N_{symb}^{slot}n_{s,f}^{\mu} + l + 1)(2(n_{ID}\bmod 1024) + 1) +$$
$$\left.(n_{ID}\bmod 1024))\right] \bmod 2^{31} \quad \text{Formula 3}$$

$$d = \max(\log_2(n_{ID,max} + 1) - 10, 0) \quad \text{Formula 4}$$

In embodiments of this application, $n_{ID,max}$ is used to represent a maximum value of the reference signal sequence ID. For example, it is assumed $n_{ID} \in \{0, 1, \ldots, 4095\}$. In this case, $n_{ID,max}=4095$. Details of the parameter are not described again in the following descriptions.

In embodiments of this application, max represents that a larger value is selected from two values. For example, max(1, 2)=2. mod represents a modulo operation. Details of max and mod are not described again in the following descriptions.

In embodiments of this application, $\lfloor \rfloor$ represents rounding down. For example, $$\left\lfloor\frac{56}{60}\right\rfloor = 0.$$

Details of $\lfloor \rfloor$ are not described again in the following descriptions.

In embodiments of this application, $N_{symb}^{slot}$ represents a quantity of OFDM symbols in a slot, $n_{s,f}^{\mu}$ represents an index of a slot in a frame, s represents an index of a slot in which the reference signal is located, f represents an index of the frame in which the reference signal is located, l represents an index of an OFDM symbol in a slot, $n_{ID}$ represents the reference signal sequence ID, and $\mu$ represents a parameter related to a subcarrier spacing. Details of the parameters are not described again in the following descriptions.

$\mu$ represents a parameter related to a subcarrier spacing. In other words, $\mu$ may represent a subcarrier spacing. In other words, for different subcarrier spacings, corresponding values of $\mu$ may be substituted into the foregoing formula 3. For ease of understanding, the following describes a relationship between $\mu$ and a subcarrier spacing by using Table 1.

TABLE 1

| $\mu$ | Subcarrier spacing: $\Delta f = 2^{\mu}*15$ (kHz) | CP |
|---|---|---|
| 0 | 15 | Normal |
| 1 | 30 | Normal |
| 2 | 60 | Normal, Extended |
| 3 | 120 | Normal |
| 4 | 240 | Normal |

Table 1 lists a relationship between $\mu$ and a subcarrier spacing. This application is not limited thereto. For example, another relationship between $\mu$ and a subcarrier spacing may appear in the future, and can still be applicable to embodiments of this application.

The initial factor $c_{init}$ is obtained according to the foregoing formula 3. Therefore, not only compatibility and reuse between a PRS and an NR CSI-RS can be supported, but also a case in which a quantity of $n_{ID}$ is greater than or equal to 1024 (in other words, the maximum value of $n_{ID}$ may be greater than or equal to 1023) and a case in which a quantity of $n_{ID}$ is less than 1024 (in other words, the maximum value of $n_{ID}$ may be less than 1023) can be supported. For ease of understanding, the following provides descriptions with reference to FIG. 5.

Figure 5:
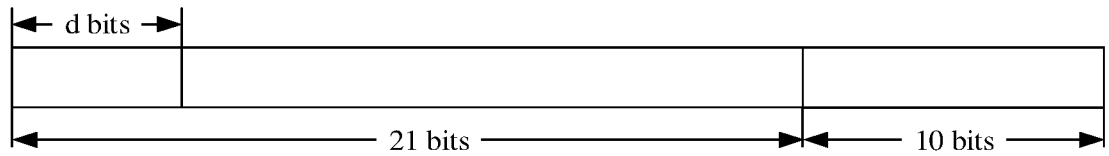
FIG. 5 is a schematic diagram of a possible bit mapping manner of $c_{init}$ applicable to embodiments of this application.

FIG. 5 shows a possible bit mapping manner corresponding to the formula 3. As shown in FIG. 5, 10 least significant bits may be used to represent $n_{ID}$ mod 1024, and then 21 most significant bits are used to represent $(N_{symb}^{slot}n_{s,f}^{\mu}+l+1)(2(n_{ID} \bmod 1024)+1)$.

The solution 1 can support the case in which a quantity of $n_{ID}$ is greater than or equal to 1024, in other words, can support the case in which the maximum value of $n_{ID}$ is greater than or equal to 1023. The solution 1 can also support the case in which a quantity of $n_{ID}$ is less than 1024, in other words, can support the case in which the maximum value of $n_{ID}$ is less than 1023. The following separately describes the two cases.

Case 1: In the solution 1, the maximum value of $n_{ID}$ may be greater than or equal to 1023.

Alternatively, it may be understood as that in the case 1, a quantity of reference signal sequence IDs or a quantity of $n_{ID}$ may be greater than or equal to 1024.

As shown in FIG. 5, when the maximum value of $n_{ID}$ is greater than or equal to 1024, to distinguish between different sequences, d most significant bits may be used to represent $$\left\lfloor\frac{n_{ID}}{1024}\right\rfloor,$$

that is, d bits in the 21 bits are used to represent $$\left\lfloor\frac{n_{ID}}{1024}\right\rfloor,$$

where a length of the d bits is determined based on the maximum value of $n_{ID}$. It should be noted that the d bits overlap the 21 most significant bits, so that an addition operation is performed. Therefore, an operation of mod $2^{31}$ is performed at the end of the expression, to limit a total length within 31 bits.

It should be understood that when the maximum value of $n_{ID}$ is greater than or equal to 1024, d most significant bits may be used to represent $$\left\lfloor\frac{n_{ID}}{1024}\right\rfloor,$$

or d middle bits may be used to represent $$\left\lfloor\frac{n_{ID}}{1024}\right\rfloor.$$

This is not limited. In embodiments of this application, an example in which d most significant bits are used to represent $$\left\lfloor \frac{n_{ID}}{1024} \right\rfloor$$

is used for description.

Case 2: In the solution 1, the maximum value of $n_{ID}$ less than 1023.

Alternatively, it may be understood as that in the case 1, a quantity of reference signal sequence IDs or a quantity of $n_{ID}$ is less than 1024.

As shown in FIG. 5, when the maximum value of $n_{ID}$ is less than 1024, $$\left\lfloor \frac{n_{ID}}{1024} \right\rfloor = 0.$$

In other words, a value of d changes to 0. In this case, a PRS generation manner is consistent with a CSI-RS generation manner.

Optionally, the solution 1 can support compatibility and reuse between a PRS and an NR CSI-RS. In other words, when necessary, the PRS pilot may be used as the NR CSI-RS.

For ease of understanding, the following briefly describes an initial factor $c_{init}$ of an NR CSI-RS sequence.

The initial factor $c_{init}$ of the NR CSI-RS sequence may be obtained according to the following formula 5:

$$c_{init} = (2^{10}(N_{symb}^{slot}n_{s,f}^{\mu}+l+1)(2n_{ID}+1)+n_{ID}) \bmod 2^{31},$$
where $n_{ID} \in \{0, 1, \ldots, 1023\}$  Formula 5

Figure 6:
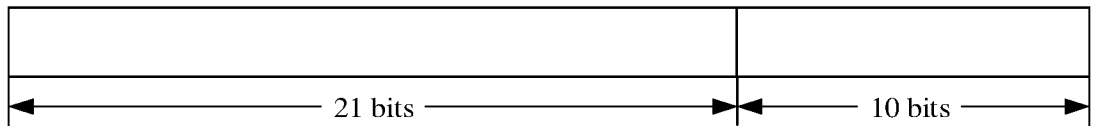
FIG. 6 is a schematic diagram of a possible bit mapping manner of $c_{init}$ of an NR CSI-RS sequence.

FIG. 6 shows a possible bit mapping manner corresponding to the formula 5. 10 least significant bits are used to represent $n_{ID}$, and then 21 remaining bits are used to represent $(N_{symb}^{slot}n_{s,f}^{\mu}+l+1)(2n_{ID}+1)$. Considering that for some subcarrier spacings, a total quantity of required bits may exceed 31, a limitation of mod $2^{31}$ is added to the formula 5 to prevent overflow. In this case, CSI-RS sequences generated on different symbols or in different slots may be consistent, and coordination is controlled through networking.

In the foregoing solution 1, the foregoing formula 3 for calculating the initial factor $c_{init}$ is used. Therefore, not only compatibility and reuse between a PRS and a CSI-RS can be supported, but also the case in which the maximum value of $n_{ID}$ is greater than or equal to 1023, that is, the case in which a quantity of reference signal sequence IDs is greater than or equal to 1024 and the case in which the maximum value of $n_{ID}$ is less than 1023, that is, the case in which a quantity of reference signal sequence IDs is less than 1024 can be supported, so that requirements of various 5G scenarios are met.

Solution 2

The initial factor $c_{init}$ may be obtained according to the following formula 6:

$$c_{init} = 2^{12}(N_{symb}^{slot}n_{s,f}^{\mu}+l+1)(2n_{ID} \bmod 2^{11-\mu}+1)+n_{ID}$$  Formula 6

In the solution 2, a maximum value of $n_{ID}$ may be less than or equal to 4095. In other words, a maximum quantity of $n_{ID}$ or a maximum quantity of reference signal sequence IDs may be 4096.

The initial factor $c_{init}$ is obtained according to the foregoing formula 6, so that sequence generation manners at different subcarrier spacings can be supported. For ease of understanding, the following provides descriptions with reference to FIG. 7.

Figure 7:
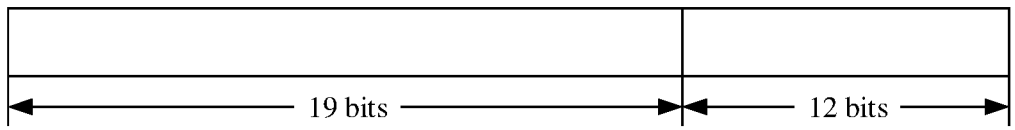
FIG. 7 to FIG. 12 each are a schematic diagram of a possible bit mapping manner of $c_{init}$ applicable to embodiments of this application.

FIG. 7 shows a possible bit mapping manner corresponding to the formula 6. As shown in FIG. 7, 12 least significant bits may be used to represent $n_{ID}$, and then 19 most significant bits are used to represent $(N_{symb}^{slot}n_{s,f}^{\mu}+l+1)(2n_{ID} \bmod 2^{11-\mu}+1)$.

In consideration of different subcarrier spacings, quantities of bits that need to be occupied by $(N_{symb}^{slot}n_{s,f}^{\mu}+l+1)$ may be different, and a total quantity of bits may exceed 19. To prevent overflow, an operation of mod $2^{11-\mu}$, for example, the second item $(2n_{ID} \bmod 2^{11-\mu}+1)$, is considered to be performed, to limit a quantity of bits within 11-μ.

The following table 2 shows a quantity, specified in a protocol and corresponding to μ, of slots included in each frame, and then a corresponding quantity of bits may be calculated for allocation.

TABLE 2

| μ | $n_{s,f}^{\mu}$ | Maximum value of $N_{symb}^{slot}n_{s,f}^{\mu}$ | Quantity of bits of $(N_{symb}^{slot}n_{s,f}^{\mu}+l+1)$ | Quantity of bits of $(2n_{ID} \bmod_2 ^{11-\mu}+1)$ |
| --- | --- | --- | --- | --- |
| 0 | 10 | 140 | 8 bits | 11 bits |
| 1 | 20 | 280 | 9 bits | 10 bits |
| 2 | 30 | 560 | 10 bits | 9 bits |
| 3 | 40 | 1120 | 11 bits | 8 bits |

In the foregoing solution 2, the foregoing formula 6 for calculating the initial factor $c_{init}$ is used, so that sequence generation manners at different subcarrier spacings can be supported, and requirements of various 5G scenarios are met.

Solution 3

The initial factor $c_{init}$ may be obtained according to the following formula 7:

$$c_{init} = 2^{13}(N_{symb}^{slot}n_{s,f}^{\mu}+l+1)(2n_{ID} \bmod 2^{10-\mu}+1)+2n_{ID}+N_{CP}$$  Formula 7

In the solution 3, a maximum value of $n_{ID}$ may be less than or equal to 4095. In other words, a maximum quantity of $n_{ID}$ or a maximum quantity of reference signal sequence IDs may be 4096.

In the solution 3, impact of a CP type on the initial factor is considered. It may alternatively be understood as that, based on the solution 2, 1 least significant bit is used to represent a CP type, for example, $N_{CP}=0$, or $N_{CP}=1$. For ease of understanding, the following provides descriptions with reference to FIG. 8.

Figure 8:
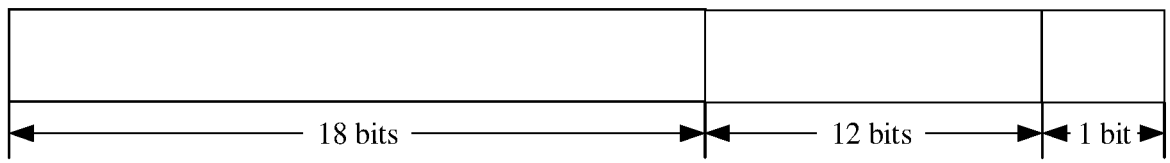

FIG. 8 shows a possible bit mapping manner corresponding to the formula 7. As shown in FIG. 8, 1 least significant bit may be used to represent a CP type, 12 second most significant bits are used to represent $n_{ID}$, and 18 remaining bits are used to represent $(N_{symb}^{slot}n_{s,f}^{\mu}+l+1)(2n_{ID} \bmod 2^{10-\mu}+1)$.

In consideration of different subcarrier spacings, quantities of bits that need to be occupied by $(N_{symb}^{slot}n_{s,f}^{\mu}+l+1)$ may be different, and a total quantity of bits may exceed 18. To prevent overflow, an operation of mod $2^{10-\mu}$, for example, the second item $(2n_{ID} \bmod 2^{10-\mu}+1)$, is considered to be performed, to limit a quantity of bits within 10-μ.

In the foregoing solution 3, not only sequence generation manners at different subcarrier spacings are supported, but also impact of a CP type is considered, so that compatibility with an LTE PRS can be supported and requirements of various 5G scenarios can be met.

Solution 4

The initial factor $c_{init}$ may be obtained according to the following formula 8:

$$c_{init} = 2^{31-d} \left\lfloor \frac{n_{ID}}{1024} \right\rfloor +$$
$$2^{12}(N_{symb}^{dot} n_{s,f}^\mu + l + 1)(2n_{ID} \bmod 2^{11-d-\mu} + 1) + n_{ID} \bmod 4096$$

Formula 8

$$d = \max(\log_2(n_{ID,max} + 1) - 12, 0)$$

Formula 9

The solution 4 can support a case in which a maximum value of $n_{ID}$ is greater than or equal to 4095, in other words, can support a case in which a quantity of $n_{ID}$ or a quantity of reference signal sequence IDs is greater than or equal to 4096. The solution 4 can also support a case in which a maximum value of $n_{ID}$ is less than 4095, in other words, can support a case in which a quantity of $n_{ID}$ or a quantity of reference signal sequence IDs is less than 4096. The following separately describes the two cases.

Case 1: In the solution 4, the maximum value of $n_{ID}$ is greater than or equal to 4095.

Alternatively, it may be understood as that in the case 1, a quantity of $n_{ID}$ or a quantity of reference signal sequence IDs is greater than or equal to 4096.

Figure 9:
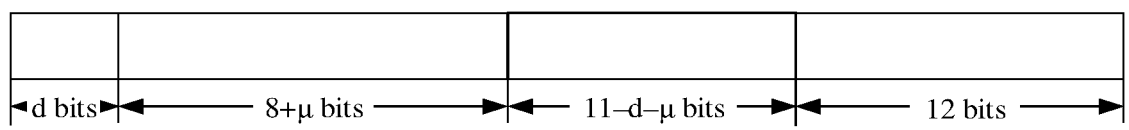

FIG. 9 shows a possible bit mapping manner corresponding to the formula 8.

When the maximum value of $n_{ID}$ is greater than or equal to 4095, d most significant bits may be used to represent $$\left\lfloor \frac{n_{ID}}{4096} \right\rfloor.$$

As shown in FIG. 9, d bits are used to represent $$\left\lfloor \frac{n_{ID}}{4096} \right\rfloor,$$

8+μ, bits are used to represent $(N_{symb}^{slot} n_{s,f}^\mu + l + 1)$, 11–d–μ bits are used to represent $(2n_{ID} \bmod 2^{11-d-\mu}+1)$, and 12 bits are used to represent $n_{ID} \bmod 4096$.

It should be understood that when the maximum value of $n_{ID}$ is greater than or equal to 4095, a bit used to represent $$\left\lfloor \frac{n_{ID}}{4096} \right\rfloor$$

may be added as a most significant bit, and a bit used to represent $$\left\lfloor \frac{n_{ID}}{4096} \right\rfloor$$

may be added as a middle bit. This is not limited. In embodiments of this application, an example in which a bit used to represent $$\left\lfloor \frac{n_{ID}}{4096} \right\rfloor$$

is added as a most significant bit is used for description.

Case 2: In the solution 4, the maximum value of $n_{ID}$ is less than 4095.

Alternatively, it may be understood as that in the case 2, a quantity of $n_{ID}$ or a quantity of reference signal sequence IDs is less than 4096.

When the maximum value of $n_{ID}$ is less than 4095, as shown in FIG. 9, a quantity d of most significant bits (that is, a value of d) changes to 0. In this case, most significant bits may be represented in the manner shown in FIG. 9, or 19 bits may be used to represent $(N_{symb}^{slot} n_{s,f}^\mu + l + 1)(2n_{ID} \bmod 2^{11-\mu}+1)$. When 19 bits are used to represent $(N_{symb}^{slot} n_{s,f}^\mu + l + 1)(2n_{ID} \bmod 2^{11-\mu}+1)$, the mapping manner is consistent with the mapping manner in the solution 2.

In this case, the formula 8 is transformed into:

$$c_{init} = 2^{31-d} \left\lfloor \frac{n_{ID}}{4096} \right\rfloor +$$
$$2^{12}(N_{symb}^{slot} n_{s,f}^\mu + l + 1)(2n_{ID} \bmod 2^{11-d-\mu} + 1) + n_{ID} \bmod 4096$$
$$= 2^{12}(N_{symb}^{slot} n_{s,f}^\mu + l + 1)(2n_{ID} \bmod 2^{11-\mu} + 1) + n_{ID}.$$

It can be learned that when the maximum value of $n_{ID}$ is less than 4095, the formula 8 is transformed into the formula 6. It may alternatively be understood as that when the maximum value of $n_{ID}$ is less than 4095, the solution 4 is the solution 2.

Optionally, the solution 4 may be used as a general solution, and may be used in both the case in which a quantity of reference signal sequence IDs is greater than or equal to 4096 and the case in which a quantity of reference signal sequence IDs is less than 4096.

The foregoing solution 4 not only supports sequence generation manners at different subcarrier spacings, but also may be used for the case in which a quantity of reference signal sequence IDs is greater than or equal to 4096 (that is, the case in which the maximum value of $n_{ID}$ is greater than or equal to 4095) and the case in which a quantity of reference signal sequence IDs is less than 4096 (that is, the case in which the maximum value of $n_{ID}$ is less than 4095), so that requirements of various 5G scenarios are met.

Solution 5

The initial factor $c_{init}$ may be obtained according to the following formula 10:

$$c_{init} =$$
$$\left(2^{31-d} \left\lfloor \frac{n_{ID}}{4096} \right\rfloor + 2^{12}(N_{symb}^{slot} n_{s,f}^\mu + l + 1)(2n_{ID} \bmod 2^{11-\mu} + 1) + n_{ID} \bmod 4096\right) \bmod 2^{31}$$

Formula 10 d is obtained according to the foregoing formula 9.

The solution 5 can support a case in which a maximum value of $n_{ID}$ is greater than or equal to 4095, in other words, can support a case in which a quantity of $n_{ID}$ or a quantity of reference signal sequence IDs is greater than or equal to 4096. The solution 5 can also support a case in which a maximum value of $n_{ID}$ is less than 4095, in other words, can support a case in which a quantity of $n_{ID}$ or a quantity of reference signal sequence IDs is less than 4096. The following separately describes the two cases.

Case 1: In the solution 5, the maximum value of $n_{ID}$ is greater than or equal to 4095.

Alternatively, it may be understood as that in the case 1, a quantity of $n_{ID}$ or a quantity of reference signal sequence IDs is greater than or equal to 4096.

Figure 10:
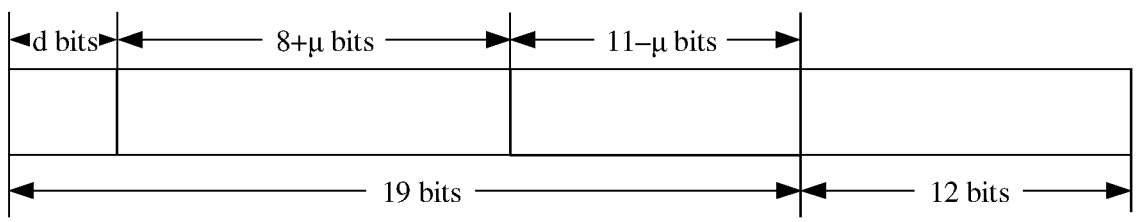

FIG. 10 shows a possible bit mapping manner corresponding to the formula 10.

When the maximum value of $n_{ID}$ is greater than or equal to 4095, a length of most significant bits is 19 bits, some of the 19 bits represent $(N_{symb}^{slot}n_{s,f}^{\mu}+l+1)(2n_{ID} \bmod 2^{11-\mu}+1)$, d bits in the 19 bits represent $$\left\lfloor \frac{n_{ID}}{4096} \right\rfloor,$$

and an operation of mod $2^{11}$ is performed after a numeric item represented by the d most significant bits in the 19 bits is added to a numeric item represented by a remaining bit. As shown in FIG. 10, d bits are used to represent $$\left\lfloor \frac{n_{ID}}{4096} \right\rfloor,$$

$8+\mu$ bits are used to represent $(N_{symb}^{slot}n_{s,f}^{\mu}+l+1)$, $11-\mu$ bits are used to represent $(2n_{ID} \bmod 2^{11-d-\mu}+1)$, and 12 bits are used to represent $n_{ID} \bmod 4096$.

It should be understood that a most significant bit may be used to represent $$\left\lfloor \frac{n_{ID}}{4096} \right\rfloor,$$

or a middle bit may be used to represent $$\left\lfloor \frac{n_{ID}}{4096} \right\rfloor.$$

This is not limited. In embodiments of this application, an example in which a most significant bit is used to represent $$\left\lfloor \frac{n_{ID}}{4096} \right\rfloor$$

is used for description.

Case 2: In the solution 5, the maximum value of $n_{ID}$ is less than 4095.

Alternatively, it may be understood as that in the case 2, a quantity of $n_{ID}$ or a quantity of reference signal sequence IDs is less than 4096.

When the maximum value of $n_{ID}$ is less than 4095, as shown in FIG. 10, a quantity d of most significant bits changes to 0. In this case, 19 most significant bits may be represented in the manner shown in FIG. 10, or 19 bits may be used to represent $(N_{symb}^{slot}n_{s,f}^{\mu}+l+1)(2n_{ID} \bmod 2^{11-\mu}+1)$. When 19 bits are used to represent $(N_{symb}^{slot}n_{s,f}^{\mu}+l+1)(2n_{ID} \bmod 2^{11-\mu}+1)$, the mapping manner is consistent with the mapping manner in the solution 2.

In this case, the formula 10 is transformed into:

$$c_{init} = 2^{31-d}\left\lfloor \frac{n_{ID}}{4096} \right\rfloor +$$

$$2^{12}(N_{symb}^{slot}n_{s,f}^{\mu}+l+1)(2n_{ID} \bmod 2^{11-\mu}+1) +$$

-continued
$$n_{ID} \bmod 4096) \bmod 2^{31}$$

$$= 2^{12}(N_{symb}^{slot}n_{s,f}^{\mu}+l+1)(2n_{ID} \bmod 2^{11-\mu}+1) + n_{ID}.$$

It can be learned that when the maximum value of $n_{ID}$ is less than 4095, the formula 10 is transformed into the formula 6. It may alternatively be understood as that when the maximum value of $n_{ID}$ is less than 4095, the solution 5 is the solution 2.

Optionally, the solution 5 may be used as a general solution, and may be used in both the case in which a quantity of reference signal sequence IDs is greater than or equal to 4096 and the case in which a quantity of reference signal sequence IDs is less than 4096. The solution 5 may meet requirements of various 5G scenarios.

The foregoing solution 5 not only supports sequence generation manners at different subcarrier spacings, but also considers the case in which a quantity of reference signal sequence IDs is greater than or equal to 4096 (that is, the case in which the maximum value of $n_{ID}$ is greater than or equal to 4095) and the case in which a quantity of reference signal sequence IDs is less than 4096 (that is, the case in which the maximum value of $n_{ID}$ is less than 4095).

Solution 6

The initial factor $c_{init}$ may be obtained according to the following formula 11:

$$c_{init} = \qquad\qquad\qquad\qquad\qquad\qquad\text{Formula 11}$$
$$2^{31-d}\left\lfloor \frac{n_{ID}}{4096} \right\rfloor + 2^{13}(N_{symb}^{slot}n_{s,f}^{\mu}+l+1)(2n_{ID} \bmod 2^{10-d-\mu}+1) +$$
$$2(n_{ID} \bmod 4096) + N_{CP}$$

d is obtained according to the foregoing formula 9. In the solution 6, impact of a CP type on the initial factor is considered. It may alternatively be understood as that, based on the solution 4, 1 least significant bit is used to represent a CP type.

The solution 6 can support a case in which a maximum value of $n_{ID}$ is greater than or equal to 4095, in other words, can support a case in which a quantity of $n_{ID}$ or a quantity of reference signal sequence IDs is greater than or equal to 4096. The solution 6 can also support a case in which a maximum value of $n_{ID}$ is less than 4095, in other words, can support a case in which a quantity of $n_{ID}$ of a quantity of reference signal sequence IDs is less than 4096. The following separately describes the two cases.

Case 1: In the solution 6, the maximum value of $n_{ID}$ is greater than or equal to 4095.

Alternatively, it may be understood as that in the case 1, a quantity of $n_{ID}$ or a quantity of reference signal sequence IDs is greater than or equal to 4096.

Figure 11:
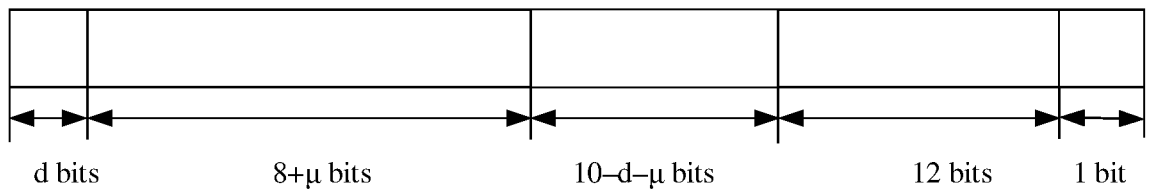

FIG. 11 shows a possible bit mapping manner corresponding to the formula 11.

When the maximum value of $n_{ID}$ is greater than or equal to 4095, a most significant bit may be used to represent $$\left\lfloor \frac{n_{ID}}{4096} \right\rfloor,$$

1 least significant bit is used to represent a CP type, and a remaining bit is used to represent $(N_{symb}^{slot}n_{s,f}^{\mu}+l+1)(2n_{ID} \bmod 2^{10-d-\mu}+1)$. As shown in FIG. 11, d bits are used to represent $\lfloor \frac{n_{ID}}{4096} \rfloor$, 8+μ bits are used to represent $(N_{symb}^{slot} n_{s,f}^{\mu}+l+1)$, 10–d–μ bits are used to represent $(2n_{ID} \bmod 2^{10-d-\mu}+1)$, 12 bits are used to represent $n_{ID} \bmod 4096$, and 1 bit is used to represent a CP type.

It should be understood that when the maximum value of $n_{ID}$ is greater than or equal to 4095, a most significant bit may be used to represent $\lfloor \frac{n_{ID}}{4096} \rfloor$, or a middle bit may be used to represent $\lfloor \frac{n_{ID}}{4096} \rfloor$.

This is not limited. In embodiments of this application, an example in which a most significant bit is used to represent $\lfloor \frac{n_{ID}}{4096} \rfloor$ is used for description.

Case 2: In the solution 6, the maximum value of $n_{ID}$ is less than 4095.

Alternatively, it may be understood as that in the case 2, a quantity of $n_{ID}$ or a quantity of reference signal sequence IDs is less than 4096.

When the maximum value of $n_{ID}$ is less than 4095, as shown in FIG. 11, a quantity d of most significant bits changes to 0. In this case, 18 most significant bits may be used to represent $(N_{symb}^{slot} n_{s,f}^{\mu}+l+1)(2n_{ID} \bmod 2^{10-\mu}+1)$, and the mapping manner is consistent with the mapping manner in the solution 3.

In this case, the formula 11 is transformed into:

$$c_{init} = 2^{31-d}\lfloor \frac{n_{ID}}{4096} \rfloor +$$
$$2^{13}(N_{symb}^{slot} n_{s,f}^{\mu}+l+1)2(n_{ID} \bmod 2^{10-d-\mu}+1) +$$
$$2(n_{ID} \bmod 4096) + N_{CP}$$
$$= 2^{13}(N_{symb}^{slot} n_{s,f}^{\mu}+l+1)(2n_{ID} \bmod 2^{10-\mu}+1) +^2 n_{ID} + N_{CP}.$$

It can be learned that when the maximum value of $n_{ID}$ is less than 4095, the formula 11 is transformed into the formula 7. It may alternatively be understood as that when the maximum value of $n_{ID}$ is less than 4095, the solution 6 is the solution 3.

Optionally, the solution 6 may be used as a general solution, and may be used in both the case in which a quantity of reference signal sequence IDs is greater than or equal to 4096 and the case in which a quantity of reference signal sequence IDs is less than 4096.

The foregoing solution 6 supports sequence generation manners at different subcarrier spacings, may be used for the case in which a quantity of reference signal sequence IDs is greater than or equal to 4096 (that is, the case in which the maximum value of $n_{ID}$ is greater than or equal to 4095) and the case in which a quantity of reference signal sequence IDs is less than 4096 (that is, the case in which the maximum value of $n_{ID}$ is less than 4095), and considers impact of a CP type.

Solution 7

The initial factor $c_{init}$ may be obtained according to the following formula 12:

$$c_{init} = \left(2^{31-d}\lfloor \frac{n_{ID}}{4096} \rfloor + 2^{13}(N_{symb}^{slot} n_{s,f}^{\mu}+l+1)(2n_{ID} \bmod 2^{10-\mu}+1) + 2(n_{ID} \bmod 4096) + N_{CP}\right) \bmod 2^{31}$$

Formula 12 d is obtained according to the foregoing formula 9. In the solution 7, impact of a CP type on the initial factor is considered. It may alternatively be understood as that, based on the solution 5, 1 least significant bit is used to represent a CP type.

The solution 7 can support a case in which a maximum value of $n_{ID}$ is greater than or equal to 4095, in other words, can support a case in which a quantity of $n_{ID}$ or a quantity of reference signal sequence IDs is greater than or equal to 4096. The solution 7 can also support a case in which a maximum value of $n_{ID}$ is less than 4095, in other words, can support a case in which a quantity of $n_{ID}$ or a quantity of reference signal sequence IDs is less than 4096. The following separately describes the two cases.

Case 1: In the solution 7, the maximum value of $n_{ID}$ is greater than or equal to 4095.

Alternatively, it may be understood as that in the case 1, a quantity of $n_{ID}$ or a quantity of reference signal sequence IDs is greater than or equal to 4096.

Figure 12:
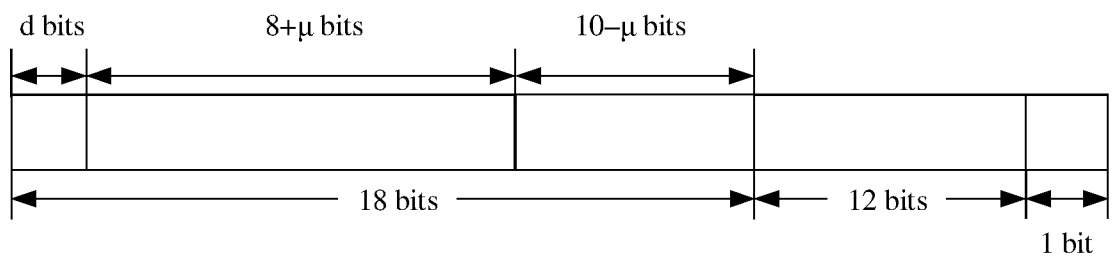

FIG. 12 shows a possible bit mapping manner corresponding to the formula 12.

When the maximum value of $n_{ID}$ is greater than or equal to 4095, a length of most significant bits is 18 bits, some of the 18 bits represent $(N_{symb}^{slot} n_{s,f}^{\mu}+l+1)(2n_{ID} \bmod 2^{10-\mu}+1)$, an operation of $\bmod 2^{31}$ is performed after d most significant bits are added to the 18 most significant bits, and 1 least significant bit is used to represent a CP type. As shown in FIG. 12, d bits are used to represent $\lfloor \frac{n_{ID}}{4096} \rfloor$, 8+μ–d bits are used to represent $(N_{symb}^{slot} n_{s,f}^{\mu}+l+1)$, 10–μ bits are used to represent $(2n_{ID} \bmod 2^{10-\mu}+1)$, 12 bits are used to represent $n_{ID} \bmod 4096$, and 1 bit is used to represent a CP type.

It should be understood that when the maximum value of $n_{ID}$ is greater than or equal to 4095, a most significant bit may be used to represent $\lfloor \frac{n_{ID}}{4096} \rfloor$, or a middle bit may be used to represent $\lfloor \frac{n_{ID}}{4096} \rfloor$.

This is not limited. In embodiments of this application, an example in which a most significant bit is used to represent $$\left\lfloor \frac{n_{ID}}{4096} \right\rfloor$$

is used for description.

Case 2: In the solution 7, the maximum value of $n_{ID}$ is less than 4095.

Alternatively, it may be understood as that in the case 2, a quantity of $n_{ID}$ or a quantity of reference signal sequence IDs is less than 4096.

When the maximum value of $n_{ID}$ is less than 4095, as shown in FIG. 12, a quantity d of most significant bits changes to 0. In this case, 18 bits may be used to represent $(N_{symb}^{slot} n_{s,f}^{\mu}+l+1)(2n_{ID} \bmod 2^{10-\mu}+1)$, and the mapping manner is consistent with the mapping manner in the solution 3.

In this case, the formula 12 is transformed into:

$$\begin{aligned} c_{init} &= \left(2^{31-d}\left\lfloor \frac{n_{ID}}{4096}\right\rfloor\right) + \\ &\quad 2^{13}\left(N_{symb}^{slot} n_{s,f}^{\mu}+l+1\right)\left(2n_{ID}\bmod 2^{10-\mu}+1\right) + \\ &\quad 2(n_{ID}\bmod 4096) + N_{CP})\bmod 2^{31} \\ &= 2^{13}\left(N_{symb}^{slot} n_{s,f}^{\mu}+l+1\right)\left(2n_{ID}\bmod 2^{10-\mu}+1\right) + 2n_{ID} + N_{CP}. \end{aligned}$$

It can be learned that when the maximum value of $n_{ID}$ is less than 4095, the formula 12 is transformed into the formula 7. It may alternatively be understood as that when the maximum value of $n_{ID}$ is less than 4095, the solution 7 is the solution 3.

Optionally, the solution 7 may be used as a general solution, and may be used in both the case in which a quantity of reference signal sequence IDs is greater than or equal to 4096 and the case in which a quantity of reference signal sequence IDs is less than 4096.

The foregoing solution 7 supports sequence generation manners at different subcarrier spacings, may be used for the case in which a quantity of reference signal sequence IDs is greater than or equal to 4096 (that is, the case in which the maximum value of $n_{ID}$ is greater than or equal to 4095) and the case in which a quantity of reference signal sequence IDs is less than 4096 (that is, the case in which the maximum value of $n_{ID}$ is less than 4095), and considers impact of a CP type.

The foregoing describes the seven solutions by using examples. This application is not limited thereto. Any variant solution of the foregoing seven solutions or any variant formula of the formulas in the foregoing seven solutions falls within the protection scope of the embodiments of this application.

It should be understood that in some of the foregoing embodiments, a PRS sequence is used as an example for description. This application is not limited thereto. For example, a pseudo-random sequence initial factor $c_{init}$ used for another pilot sequence may also be generated with reference to the embodiments of this application.

Based on the foregoing technical solutions, the pseudo-random sequence initial factor $c_{init}$ may be used more flexibly. For example, the provided pseudo-random sequence initial factor $c_{init}$ may implement compatibility and reuse between an NR PRS and an NR CSI-RS; or the provided pseudo-random sequence initial factor $c_{init}$ can support the scenario in which a quantity of reference signal sequence IDs is greater than or equal to 4096 (in other words, the maximum value of $n_{ID}$ may be greater than or equal to 4095); or the provided pseudo-random sequence initial factor $c_{init}$ can support cases of different designs at different subcarrier spacings; or the provided pseudo-random sequence initial factor $c_{init}$ can support cases of different CP types. Therefore, based on the embodiments of this application, different pseudo-random sequence initial factors $c_{init}$ may be selected based on actual requirements.

The embodiments described in this specification may be independent solutions, or may be combined based on internal logic. All these solutions fall within the protection scope of this application.

It may be understood that in the foregoing method embodiments, a method and an operation implemented by the terminal device may alternatively be implemented by a component (for example, a chip or a circuit) that may be used in the terminal device, and a method and an operation implemented by the network device may alternatively be implemented by a component (for example, a chip or a circuit) that may be used in the network device.

The foregoing describes in detail the methods provided in the embodiments of this application with reference to FIG. 4 to FIG. 12. The following describes in detail communications apparatuses provided in the embodiments of this application with reference to FIG. 13 to FIG. 17. It should be understood that descriptions of apparatus embodiments correspond to descriptions of the method embodiments. Therefore, for content that is not described in detail, refer to the foregoing method embodiments. For brevity, details are not described herein again.

The foregoing mainly describes the solutions provided in embodiments of this application from a perspective of interaction between network elements. It may be understood that, to implement the foregoing functions, each network element, such as a transmit end device or a receive end device, includes a corresponding hardware structure and/or software module for performing each function. A person skilled in the art may be aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the transmit end device or the receive end device may be divided into function modules based on the foregoing method examples. For example, function modules may be divided based on functions, or two or more functions may be integrated into one processing module. The integrated module may be implemented in a form of hardware, or may be implemented in a form of a software function module. It should be noted that, in embodiments of this application, division into the modules is an example and is merely logical function division. During actual implementation, another division manner may be used. An example in which function modules are divided based on functions is used below for description.

Figure 13:
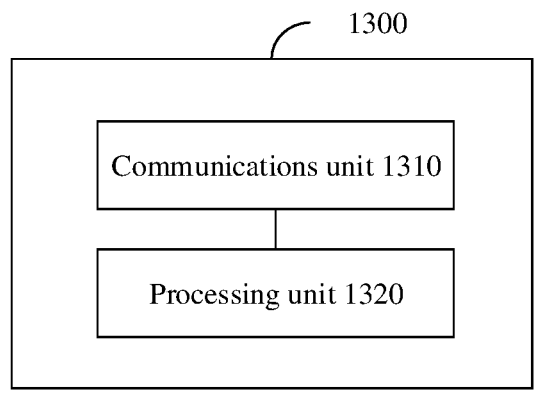
FIG. 13 is a schematic block diagram of a communications apparatus according to embodiments of this application.

FIG. 13 is a schematic block diagram of a communications apparatus according to embodiments of this application. As shown in the figure, the communications apparatus 1300 may include a communications unit 1310 and a processing unit 1320. The communications unit 1310 may communicate with the outside, and the processing unit 1320 is configured to process data. The communications unit 1310 may also be referred to as a communications interface or a transceiver unit.

In a possible design, the communications apparatus 1300 may implement a step or a procedure performed by the terminal device in the foregoing method embodiments, for example, may be a terminal device, or a chip or a circuit configured in a terminal device. In this case, the communications apparatus 1300 may be referred to as a terminal device. The communications unit 1310 is configured to perform sending/receiving-related operations on a terminal device side in the foregoing method embodiments, and the processing unit 1320 is configured to perform processing-related operations on the terminal device side in the foregoing method embodiments.

In a possible implementation, the communications unit 1310 is configured to receive a reference signal; the processing unit 1320 is configured to obtain a first sequence based on the reference signal; the processing unit 1320 is further configured to obtain a second sequence based on a pseudo-random sequence initial factor $c_{init}$; and the processing unit 1320 is further configured to perform correlation detection on the first sequence and the second sequence, where the pseudo-random sequence initial factor $c_{init}$ is related to a parameter d, $$d=\max(\log_2(n_{ID,max}+1)-10,0) \text{ or } d=\max(\log_2(n_{ID,max}+1)-12,0)$$

max represents that a larger value is selected from two values, and $n_{ID,max}$ represents a maximum value of a reference signal sequence ID.

Optionally, $d=\max(\log_2(n_{ID,max}+1)-10,0)$, and the processing unit 1320 is configured to obtain the pseudo-random sequence initial factor $c_{init}$ according to the following formula:

$$c_{init} = \left[2^{31-d}\left\lfloor\frac{n_{ID}}{1024}\right\rfloor + \left(2^{10}(N_{symb}^{slot}n_{s,f}^{\mu}+l+1)(2(n_{ID}\bmod 1024)+1)+(n_{ID}\bmod 1024)\right)\right]\bmod 2^{31},$$

where $N_{symb}^{slot}$ represents a quantity of OFDM symbols in a slot, $\lfloor \ \rfloor$ represents rounding down, $n_{s,f}^{\mu}$ represents an index of a slot in a frame, l represents an index of an OFDM symbol in a slot, $n_{ID}$ represents the reference signal sequence ID, μ represents a parameter related to a subcarrier spacing, and mod represents a modulo operation.

Optionally, $d=\max(\log_2(n_{ID,max}+1)-12,0)$, and the processing unit 1320 is configured to obtain the pseudo-random sequence initial factor $c_{init}$ according to either of the following formulas:

$$c_{init} = 2^{31-d}\left\lfloor\frac{n_{ID}}{1024}\right\rfloor + 2^{12}(N_{symb}^{slot}n_{s,f}^{\mu}+l+1)(2n_{ID}\bmod 2^{11-d-\mu}+1)+n_{ID}\bmod 4096;$$

or $$c_{init} = 2^{31-d}\left\lfloor\frac{n_{ID}}{1024}\right\rfloor + 2^{13}(N_{symb}^{slot}n_{s,f}^{\mu}+l+1)(2n_{ID}\bmod 2^{10-d-\mu}+1)+2(n_{ID}\bmod 4096)+N_{CP}.$$

A value of $N_{CP}$ represents whether a cyclic prefix CP is a normal CP or an extended CP, $N_{symb}^{slot}$ represents a quantity of OFDM symbols in a slot, $n_{s,f}^{\mu}$ represents an index of a slot in a frame, l represents an index of an OFDM symbol in a slot, $n_{ID}$ represents the reference signal sequence ID, μ represents a parameter related to a subcarrier spacing, and mod represents a modulo operation.

Optionally, the communications unit 1310 is configured to receive information about the parameter $N_{CP}$ and/or information about the parameter $n_{ID}$ that are/is sent by a network device, where a value of $N_{CP}$ represents whether the cyclic prefix CP is a normal CP or an extended CP, and $n_{ID}$ represents the reference signal sequence ID.

Optionally, the processing unit 1320 is configured to perform the correlation detection on the first sequence and the second sequence, to obtain one or more of the following measurement values: a time difference of arrival TDOA, a reference signal received quality RSRQ, or a reference signal received power RSRP.

Optionally, the reference signal is a positioning reference signal PRS.

In another possible implementation, the communications unit 1310 is configured to receive a reference signal; the processing unit 1320 is configured to obtain a first sequence based on the reference signal; the processing unit 1320 is further configured to obtain a second sequence based on a pseudo-random sequence initial factor $c_{init}$; and the processing unit 1320 is further configured to perform correlation detection on the first sequence and the second sequence, where the processing unit 1320 is configured to obtain the pseudo-random sequence initial factor $c_{init}$ according to either of the following formulas:

$$c_{init}=2^{12}(N_{symb}^{slot}n_{s,f}^{\mu}+l+1)(2n_{ID}\bmod 2^{11-\mu}+1)+n_{ID};$$

or $$c_{init}=2^{13}(N_{symb}^{slot}n_{s,f}^{\mu}+l+1)(2n_{ID}\bmod 2^{10-\mu}+1)+n_{ID}+N_{CP}.$$

A value of $N_{CP}$ represents whether a cyclic prefix CP is a normal CP or an extended CP, $N_{symb}^{slot}$ represents a quantity of OFDM symbols in a slot, $n_{s,f}^{\mu}$ represents an index of a slot in a frame, l represents an index of an OFDM symbol in a slot, $n_{ID}$ represents a reference signal sequence ID, μ represents a parameter related to a subcarrier spacing, and mod represents a modulo operation.

Optionally, the communications unit 1310 is configured to receive information about the parameter $N_{CP}$ and/or information about the parameter $n_{ID}$ that are/is sent by a network device, where a value of $N_{CP}$ represents whether the cyclic prefix CP is a normal CP or an extended CP, and $n_{ID}$ represents the reference signal sequence ID.

Optionally, the processing unit 1320 is configured to perform the correlation detection on the first sequence and the second sequence, to obtain one or more of the following measurement values: a time difference of arrival, a reference signal received quality, or a reference signal received power.

Optionally, the reference signal is a positioning reference signal PRS.

In another possible implementation, the communications unit 1310 is configured to receive a reference signal; the processing unit 1320 is configured to obtain a first sequence based on the reference signal; the processing unit 1320 is further configured to obtain a second sequence based on a pseudo-random sequence initial factor $c_{init}$; and the processing unit 1320 is further configured to perform correlation detection on the first sequence and the second sequence, where the processing unit 1320 is configured to obtain the pseudo-random sequence initial factor $c_{init}$ according to either of the following formulas:

$$c_{init} =$$
$$2^{31-d}\left\lfloor\frac{n_{ID}}{1024}\right\rfloor + 2^{12}(N_{symb}^{slot}n_{s,f}^{\mu} + l + 1)(2n_{ID}\text{mod}2^{11-d-\mu} + 1) + n_{ID}\text{mod}4096;$$

or $$c_{init} = 2^{31-d}\left\lfloor\frac{n_{ID}}{1024}\right\rfloor +$$
$$2^{13}(N_{symb}^{slot}n_{s,f}^{\mu} + l + 1)(2n_{ID}\text{mod}2^{10-d-\mu} + 1) + 2(n_{ID}\text{mod}4096) + N_{CP}.$$

d=max(log$_2$(n$_{ID,max}$+1)−12,0), max represents that a larger value is selected from two values, n$_{ID,max}$ represents a maximum value of a reference signal sequence ID, a value of N$_{CP}$ represents whether a cyclic prefix CP is a normal CP or an extended CP, $N_{symb}^{slot}$ represents a quantity of OFDM symbols in a slot, $\lfloor\ \rfloor$ represents rounding down, $n_{s,f}^{\mu}$ represents an index of a slot in a frame, l represents an index of an OFDM symbol in a slot, n$_{ID}$ represents the reference signal sequence ID, μ represents a parameter related to a subcarrier spacing, and mod represents a modulo operation.

Optionally, the communications unit 1310 is configured to receive information about the parameter N$_{CP}$ and/or information about the parameter n$_{ID}$ that are/is sent by a network device, where a value of N$_{CP}$ represents whether the cyclic prefix CP is a normal CP or an extended CP, and n$_{ID}$ represents the reference signal sequence ID.

Optionally, the processing unit 1320 is configured to perform the correlation detection on the first sequence and the second sequence, to obtain one or more of the following measurement values: a time difference of arrival, a reference signal received quality, or a reference signal received power.

Optionally, the reference signal is a positioning reference signal PRS.

In another possible implementation, the communications unit 1310 is configured to receive a reference signal; the processing unit 1320 is configured to obtain a first sequence based on the reference signal; the processing unit 1320 is further configured to obtain a second sequence based on a pseudo-random sequence initial factor $c_{init}$; and the processing unit 1320 is further configured to perform correlation detection on the first sequence and the second sequence, where the processing unit 1320 is configured to obtain the pseudo-random sequence initial factor $c_{init}$ according to either of the following formulas:

$$c_{init} =$$
$$\left(2^{31-d}\left\lfloor\frac{n_{ID}}{4096}\right\rfloor + 2^{12}(N_{symb}^{slot}n_{s,f}^{\mu} + l + 1)(2n_{ID}\text{mod}2^{11-\mu} + 1) + n_{ID}\text{mod}4096\right)$$
$$\text{mod}2^{31};$$

or $$c_{init} = \left(2^{31-d}\left\lfloor\frac{n_{ID}}{4096}\right\rfloor +\right.$$
$$\left.2^{13}(N_{symb}^{slot}n_{s,f}^{\mu} + l + 1)(2n_{ID}\text{mod}2^{10-\mu} + 1) + 2(n_{ID}\text{mod}4096) + N_{CP}\right)\text{mod}2^{31}.$$

d=max(log$_2$(n$_{ID,max}$+1)−12, 0), max represents that a larger value is selected from two values, n$_{ID,max}$ represents a maximum value of a reference signal sequence ID, a value of N$_{CP}$ represents whether a cyclic prefix CP is a normal CP or an extended CP, $N_{symb}^{slot}$ represents a quantity of OFDM symbols in a slot, $\lfloor\ \rfloor$ represents rounding down, $n_{s,f}^{\mu}$ represents an index of a slot in a frame, l represents an index of an OFDM symbol in a slot, n$_{ID}$ represents the reference signal sequence ID, μ represents a parameter related to a subcarrier spacing, and mod represents a modulo operation.

Optionally, a quantity of reference signal sequence IDs is greater than or equal to 4096.

In other words, the maximum value of the reference signal sequence ID is greater than or equal to 4095.

Optionally, the communications unit 1310 is configured to receive information about the parameter N$_{CP}$ and/or information about the parameter n$_{ID}$ that are/is sent by a network device, where a value of N$_{CP}$ represents whether the cyclic prefix CP is a normal CP or an extended CP, and n$_{ID}$ represents the reference signal sequence ID.

Optionally, the processing unit 1320 is configured to perform the correlation detection on the first sequence and the second sequence, to obtain one or more of the following measurement values: a time difference of arrival TDOA, a reference signal received quality RSRQ, or a reference signal received power RSRP.

Optionally, the reference signal is a positioning reference signal PRS.

The communications apparatus 1300 may implement a step or a procedure performed by the terminal device in the method 400 in the embodiments of this application, and the communications apparatus 1300 may include a unit configured to perform the method performed by the terminal device in the method 400 in FIG. 4. In addition, the units in the communications apparatus 1300 and the foregoing other operations and/or functions are separately used to implement corresponding procedures of the method 400 in FIG. 4.

When the communications apparatus 1300 is configured to perform the method 400 in FIG. 4, the communications unit 1310 may be configured to perform step 430 in the method 400, and the processing unit 1320 may be configured to perform steps 440 to 460 in the method 400.

It should be understood that a specific process in which each unit performs the foregoing corresponding steps is described in detail in the foregoing method embodiments. For brevity, details are not described herein again.

Figure 16:
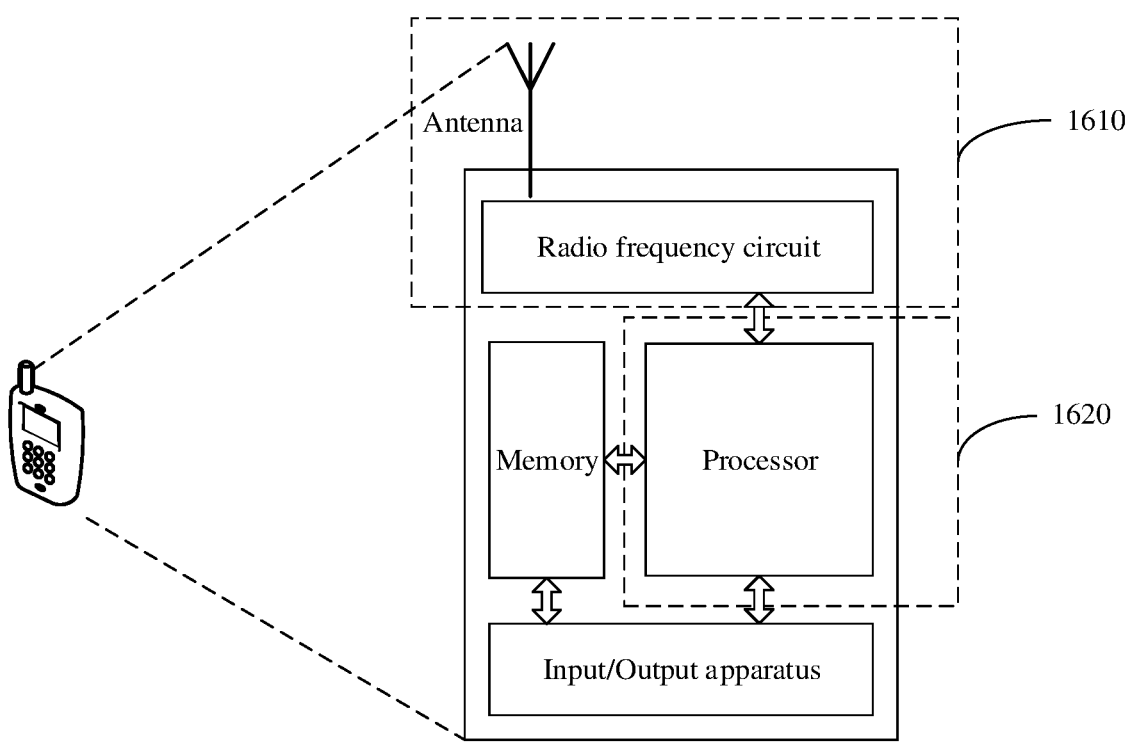
FIG. 16 is a schematic block diagram of a terminal device according to embodiments of this application.

It should be further understood that the communications unit 1310 in the communications apparatus 1300 may be implemented by using a transceiver 1620 in a terminal device 1600 shown in FIG. 16, and the processing unit 1320 in the communications apparatus 1300 may be implemented by using a processor 1610 in the terminal device 1600 shown in FIG. 16. The transceiver may include a transmitter and/or a receiver, to respectively implement functions of a sending unit and a receiving unit.

It should be further understood that a communications unit 1410 in a communications apparatus 1400 may alternatively be an input/output interface.

Figure 14:
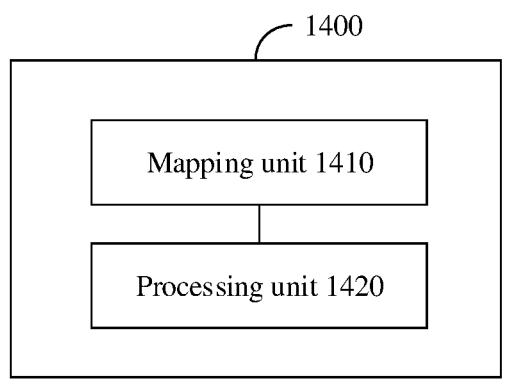
FIG. 14 is another schematic block diagram of a communications apparatus according to embodiments of this application.

FIG. 14 is a schematic block diagram of a communications apparatus according to embodiments of this application. As shown in the figure, the communications apparatus 1400 may include a sending unit 1410 and a processing unit 1420. The sending unit 1410 may be configured to send a generated reference signal. The sending unit 1410 may be a communications unit, and the communications unit may communicate with the outside. The processing unit 1420 is configured to process data, for example, perform processing such as operation and reference signal generation.

In a possible design, the communications apparatus 1400 may implement a step or a procedure performed by the network device in the foregoing method embodiments, for example, may be a network device, or a chip or a circuit configured in a network device. In this case, the communications apparatus 1400 may be referred to as a network device. The sending unit 1410 is configured to perform sending-related operations on a network device side in the foregoing method embodiments, and the processing unit 1420 is configured to perform processing-related operations on the network device side in the foregoing method embodiments.

In a possible implementation, the processing unit 1420 is configured to obtain a reference signal sequence based on a pseudo-random sequence initial factor $c_{init}$; the processing unit 1420 is further configured to map the sequence to one or more OFDM symbols, where the pseudo-random sequence initial factor $c_{init}$ is related to a parameter d, d=max(log$_2$(n$_{ID,max}$+1)−10,0 or d=max(log$_2$(n$_{ID,max}$+1)−12, 0), max represents that a larger value is selected from two values, and n$_{ID,max}$ represents a maximum value of a reference signal sequence ID; and the sending unit 1410 is configured to send a reference signal.

Optionally, d=max(log$_2$(n$_{ID,max}$+1)−10,0), and the processing unit 1420 is configured to obtain the pseudo-random sequence initial factor $c_{init}$ according to the following formula:

$$c_{init} = \left[2^{31-d}\left\lfloor\frac{n_{ID}}{1024}\right\rfloor + \left(2^{10}\left(N_{symb}^{slot}n_{s,f}^{\mu} + l + 1\right)(2(n_{ID}\mod 1024) + 1) + (n_{ID}\mod 1024)\right)\right]\mod 2^{31}.$$

$N_{symb}^{slot}$ represents a quantity of OFDM symbols in a slot, $\lfloor\ \rfloor$ represents rounding down, $n_{s,f}^{\mu}$ represents an index of a slot in a frame, l represents an index of an OFDM symbol in a slot, $n_{ID}$ represents the reference signal sequence ID, μ represents a parameter related to a subcarrier spacing, and mod represents a modulo operation.

Optionally, d=max(log$_2$(n$_{ID,max}$+1)−12,0), and the processing unit 1420 is configured to obtain the pseudo-random sequence initial factor $c_{init}$ according to either of the following formulas:

$$C_{init} = 2^{31-d}\left\lfloor\frac{n_{ID}}{1024}\right\rfloor + 2^{12}\left(N_{symb}^{slot}n_{s,f}^{\mu} + l + 1\right)\left(2n_{ID}\mod 2^{11-d-\mu} + 1\right) + n_{ID}\mod 4096;\text{ or}$$

$$C_{init} = 2^{31-d}\left\lfloor\frac{n_{ID}}{1024}\right\rfloor + 2^{13}\left(N_{symb}^{slot}n_{s,f}^{\mu} + l + 1\right)\left(2n_{ID}\mod 2^{10-d-\mu} + 1\right) + 2(n_{ID}\mod 4096 + N_{CP}).$$

A value of $N_{CP}$ represents whether a cyclic prefix CP is a normal CP or an extended CP, $N_{symb}^{slot}$ represents a quantity of OFDM symbols in a slot, $\lfloor\ \rfloor$ represents rounding down, $n_{s,f}^{\mu}$ represents an index of a slot in a frame, l represents an index of an OFDM symbol in a slot, $n_{ID}$ represents the reference signal sequence ID, μ represents a parameter related to a subcarrier spacing, and mod represents a modulo operation.

In another possible implementation, the processing unit 1420 is configured to obtain a reference signal sequence based on a pseudo-random sequence initial factor $c_{init}$; the processing unit 1420 is further configured to map the sequence to one or more OFDM symbols, where the processing unit 1420 is configured to obtain the pseudo-random sequence initial factor $c_{init}$ according to either of the following formulas:

$$c_{init}=2^{12}(N_{symb}^{slot}n_{s,f}^{\mu}+l+1)(2n_{ID}\mod 2^{11-\mu}+1)+n_{ID};$$

or $$c_{init}=2^{13}(N_{symb}^{slot}n_{s,f}^{\mu}+l+1)(2n_{ID}\mod 2^{10-\mu}+1)+2n_{ID}+N_{CP}, \text{ where}$$

a value of $N_{CP}$ represents whether a cyclic prefix CP is a normal CP or an extended CP, $N_{symb}^{slot}$ represents a quantity of OFDM symbols in a slot, $n_{s,f}^{\mu}$ represents an index of a slot in a frame, l represents an index of an OFDM symbol in a slot, $n_{ID}$ represents a reference signal sequence ID, μ represents a parameter related to a subcarrier spacing, and mod represents a modulo operation; and the sending unit 1410 is configured to send a reference signal.

In another possible implementation, the processing unit 1420 is configured to obtain a reference signal sequence based on a pseudo-random sequence initial factor $c_{init}$; the processing unit 1420 is further configured to map the sequence to one or more OFDM symbols, where the processing unit 1420 is configured to obtain the pseudo-random sequence initial factor $c_{init}$ according to either of the following formulas:

$$C_{init} = 2^{31-d}\left\lfloor\frac{n_{ID}}{1024}\right\rfloor + 2^{12}\left(N_{symb}^{slot}n_{s,f}^{\mu} + l + 1\right)\left(2n_{ID}\mod 2^{11-d-\mu} + 1\right) + n_{ID}\mod 4096;\text{ or}$$

$$C_{init} = 2^{31-d}\left\lfloor\frac{n_{ID}}{1024}\right\rfloor + 2^{13}\left(N_{symb}^{slot}n_{s,f}^{\mu} + l + 1\right)\left(2n_{ID}\mod 2^{10-d-\mu} + 1\right) + 2(n_{ID}\mod 4096 + N_{CP}),$$

where d=max(log$_2$(n$_{ID,max}$+1)−12,0), max represents that a larger value is selected from two values, n$_{ID,max}$ represents a maximum value of a reference signal sequence ID, a value of $N_{CP}$ represents whether a cyclic prefix CP is a normal CP or an extended CP, $N_{symb}^{slot}$ represents a quantity of OFDM symbols in a slot, $n_{s,f}^{\mu}$ represents an index of a slot in a frame, l represents an index of an OFDM symbol in a slot, $n_{ID}$ represents the reference signal sequence ID, μ represents a parameter related to a subcarrier spacing, and mod represents a modulo operation; and the sending unit 1410 is configured to send a reference signal.

Optionally, a quantity of reference signal sequence IDs is greater than or equal to 4096.

In another possible implementation, the processing unit 1420 is configured to obtain a reference signal sequence based on a pseudo-random sequence initial factor $c_{init}$; the processing unit 1420 is further configured to map the sequence to one or more OFDM symbols, where the processing unit 1420 is configured to obtain the pseudo-random sequence initial factor $c_{init}$ according to either of the following formulas:

$$C_{init} = \left(2^{31-d}\left\lfloor\frac{n_{ID}}{4096}\right\rfloor + 2^{12}\left(N_{symb}^{slot}n_{s,f}^{\mu} + l + 1\right)\left(2n_{ID}\mod 2^{11-\mu} + 1\right) + n_{ID}\mod 4096\right)\mod 2^{31};\text{ or}$$

$$C_{init} = \left(2^{31-d}\left\lfloor\frac{n_{ID}}{4096}\right\rfloor + 2^{13}\left(N_{symb}^{slot}n_{s,f}^{\mu} + l + 1\right)\left(2n_{ID}\mod 2^{10-\mu} + 1\right) + 2(n_{ID}\mod 4096) + N_{CP}\right)\mod 2^{31},$$

where d=max(log$_2$(n$_{ID,max}$+1)−12,0), max represents that a larger value is selected from two values, n$_{ID,max}$ represents a maximum value of a reference signal sequence ID, a value of $N_{CP}$ represents whether a cyclic prefix CP is a normal CP or an extended CP, $N_{symb}^{slot}$ represents a quantity of OFDM symbols in a slot, $\lfloor \ \rfloor$ represents rounding down, $n_{s,f}^{\mu}$ represents an index of a slot in a frame, l represents an index of an OFDM symbol in a slot, $n_{ID}$ represents the reference signal sequence ID, μ represents a parameter related to a subcarrier spacing, and mod represents a modulo operation; and the sending unit 1410 is configured to send a reference signal.

Optionally, a quantity of reference signal sequence IDs is greater than or equal to 4096.

The communications apparatus 1400 may implement a step or a procedure performed by the network device in the method 400 in embodiments of this application, and the communications apparatus 1400 may include a unit configured to perform the method performed by the network device in the method 400 in FIG. 4. In addition, the units in the communications apparatus 1400 and the foregoing other operations and/or functions are separately used to implement corresponding procedures of the method 400 in FIG. 4.

Alternatively, the communications apparatus 1400 may implement a step or a procedure performed by the network device in the method 400 in embodiments of this application, and the communications apparatus 1400 may include a unit configured to perform the method performed by the network device in the method 400 in FIG. 4. In addition, the units in the communications apparatus 1400 and the foregoing other operations and/or functions are separately used to implement corresponding procedures of the method 400 in FIG. 4.

When the communications apparatus 1400 is configured to perform the method 400 in FIG. 4, the processing unit 1420 may be configured to perform steps 410 and 420 in the method 400.

The processing unit 1420 may further include, for example, a mapping unit, where the mapping unit is configured to map the generated sequence to a time-frequency resource. Alternatively, the processing unit 1420 is configured to map the generated sequence to a time-frequency resource.

It should be understood that a specific process in which each unit performs the foregoing corresponding steps is described in detail in the foregoing method embodiments. For brevity, details are not described herein again.

Figure 17:
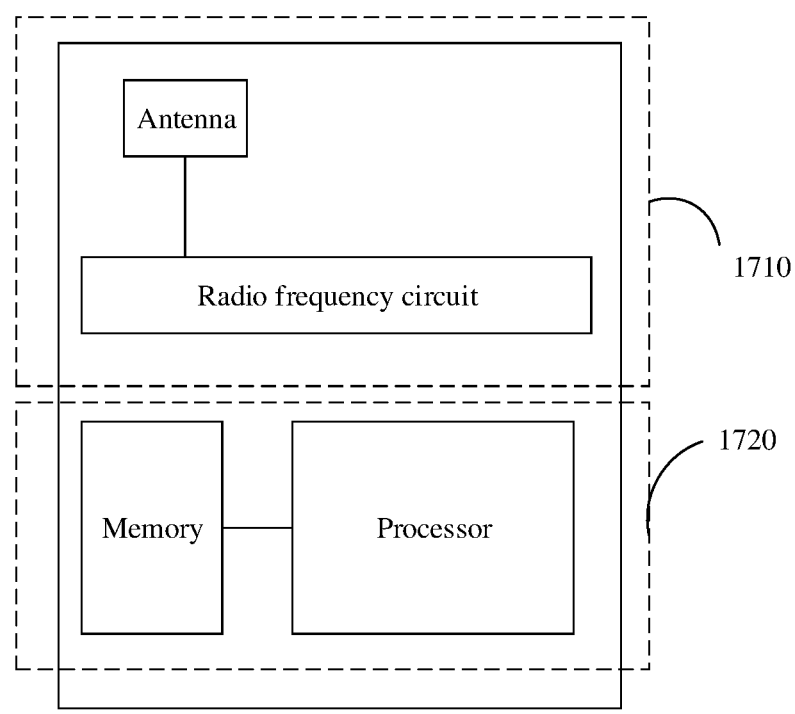
FIG. 17 is a schematic block diagram of a network device according to embodiments of this application.

It should be further understood that the sending unit 1410 in the communications apparatus 1400 may be implemented by using a transceiver 1710 in a network device 1700 shown in FIG. 17, and the processing unit 1420 in the communications apparatus 1400 may be implemented by using a processor 1720 in the network device 1700 shown in FIG. 17.

It should be further understood that a communications unit 1410 in the communications apparatus 1400 may alternatively be an input/output interface. The transceiver may include a transmitter and/or a receiver, to respectively implement functions of a sending unit and a receiving unit.

Figure 15:
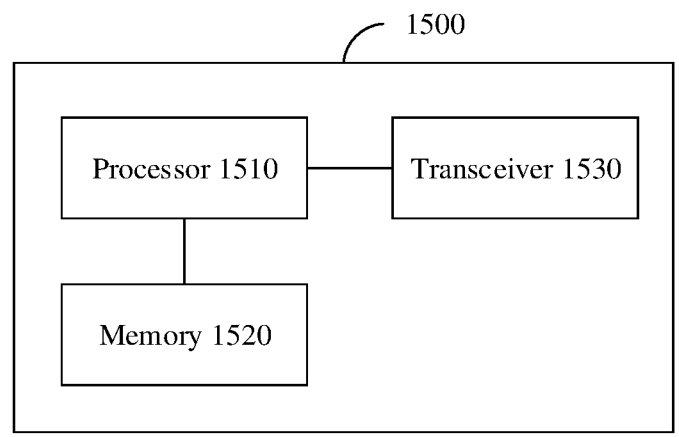
FIG. 15 is still another schematic block diagram of a communications apparatus according to embodiments of this application.

FIG. 15 is another schematic block diagram of a communications apparatus 1500 according to embodiments of this application. As shown in the figure, the communications apparatus 1500 includes a processor 1510, a memory 1520, and a transceiver 1530. The memory 1520 stores a program. The processor 1510 is configured to execute the program stored in the memory 1520, and the execution of the program stored in the memory 1520 enables the processor 1510 to perform processing-related steps in the foregoing method embodiments, and enables the processor 1510 to control the transceiver 1530 to perform sending/receiving-related steps in the foregoing method embodiments.

In an implementation, the communications apparatus 1500 is configured to perform an action performed by the terminal device in the foregoing method embodiments. In this case, the execution of the program stored in the memory 1520 enables the processor 1510 to perform processing steps on a terminal device side in the foregoing method embodiments, and enables the processor 1510 to control the transceiver 1530 to perform receiving and sending steps on the terminal device side in the foregoing method embodiments.

In another implementation, the communications apparatus 1500 is configured to perform an action performed by the network device in the foregoing method embodiments. In this case, the execution of the program stored in the memory 1520 enables the processor 1510 to perform processing steps on a network device side in the foregoing method embodiments, and enables the processor 1510 to control the transceiver 1530 to perform receiving and sending steps on the network device side in the foregoing method embodiments.

Embodiments of this application further provides a communications apparatus 1600, and the communications apparatus 1600 may be a terminal device, or may be a chip. The communications apparatus 1600 may be configured to perform an action performed by the terminal device in the foregoing method embodiments.

When the communications apparatus 1600 is a terminal device, FIG. 16 is a simplified schematic structural diagram of the terminal device. For ease of understanding and convenience of figure illustration, an example in which the terminal device is a mobile phone is used in FIG. 16. As shown in FIG. 16, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display screen, or a keyboard, is mainly configured to receive data input by a user and output data to the user. It should be noted that some types of terminal devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 16 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In embodiments of this application, the antenna and the radio frequency circuit that have receiving and sending functions may be considered as a transceiver unit of the terminal device, and the processor that has a processing function may be considered as a processing unit of the terminal device.

As shown in FIG. 16, the terminal device includes a transceiver unit 1610 and a processing unit 1620. The transceiver unit 1610 may also be referred to as a transceiver, a transceiver machine, a transceiver apparatus, or the like. The processing unit 1620 may also be referred to as a processor, a processing board, a processing module, a processing apparatus, or the like. Optionally, a component that is in the transceiver unit 1610 and that is configured to implement a receiving function may be considered as a receiving unit, and a component that is in the transceiver unit 1610 and that is configured to implement a sending function may be considered as a sending unit. In other words, the transceiver unit 1610 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

For example, in an implementation, the processing unit 1620 is configured to perform step 440 to step 460 in FIG. 4, and/or the processing unit 1620 is further configured to perform another processing step on a terminal device side in the embodiments of this application. The transceiver unit 1610 is further configured to perform step 430 shown in FIG. 4, and/or the transceiver unit 1610 is further configured to perform another sending/receiving step on the terminal device side.

It should be understood that FIG. 16 is merely an example instead of a limitation. The terminal device including the transceiver unit and the processing unit may not depend on the structure shown in FIG. 16.

When the communications device 1600 is a chip, the chip includes a transceiver unit and a processing unit. The transceiver unit may be an input/output circuit or a communications interface. The processing unit may be a processor, a microprocessor, or an integrated circuit integrated on the chip.

Embodiments of this application further provides a communications apparatus 1700, and the communications apparatus 1700 may be a network device, or may be a chip. The communications apparatus 1700 may be configured to perform an action performed by the network device in the foregoing method embodiments.

When the communications apparatus 1700 is a network device, for example, a base station, FIG. 17 is a simplified schematic structural diagram of the base station. The base station includes a part 1710 and a part 3020. The part 1710 is mainly configured to: receive and send a radio frequency signal, and perform conversion between the radio frequency signal and a baseband signal. The part 1720 is mainly configured to: perform baseband processing, control the base station, and the like. The part 1710 may usually be referred to as a transceiver unit, a transceiver machine, a transceiver circuit, a transceiver, or the like. The part 1720 is usually a control center of the base station, may usually be referred to as a processing unit, and is configured to control the base station to perform a processing operation on a network device side in the foregoing method embodiments.

The transceiver unit of the part 1710 may also be referred to as a transceiver machine, a transceiver, or the like. The transceiver unit includes an antenna and a radio frequency unit, where the radio frequency unit is mainly configured to perform radio frequency processing. Optionally, a component that is in the part 1710 and that is configured to implement a receiving function may be considered as a receiving unit, and a component that is configured to implement a sending function may be considered as a sending unit. In other words, the part 1710 includes the receiving unit and the sending unit. The receiving unit may also be referred to as a receiver machine, a receiver, a receiver circuit, or the like, and the sending unit may be referred to as a transmitter machine, a transmitter, a transmitter circuit, or the like.

The part 1720 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, a plurality of boards may share one or more processors, or a plurality of boards share one or more memories, or a plurality of boards simultaneously share one or more processors.

For example, in an implementation, the transceiver unit of the part 1710 is configured to perform a sending/receiving step on the network device side in the embodiments of this application. The processing unit of the part 1720 is configured to perform processing operations in step 410 and step 420 shown in FIG. 4, and/or the processing unit of the part 1720 is further configured to perform a processing step on the network device side in the embodiments of this application.

It should be understood that FIG. 17 is merely an example instead of a limitation. The network device including the transceiver unit and the processing unit may not depend on the structure shown in FIG. 17.

When the communications apparatus 1700 is a chip, the chip includes a transceiver unit and a processing unit. The transceiver unit may be an input/output circuit or a communications interface. The processing unit is a processor, a microprocessor, or an integrated circuit integrated on the chip.

In addition, the network device is not limited to the foregoing forms, and may also be in another form. For example, the network device includes a BBU and an adaptive radio unit (ARU), or includes a BBU and an active antenna unit (AAU), or may be customer premises equipment (CPE), or may be in another form. This is not limited in this application.

The BBU may be configured to perform an action that is implemented inside the network device and that is described in the foregoing method embodiments, and the RRU may be configured to perform an action of receiving or sending that is performed by the network device from or to the terminal device and that is described in the foregoing method embodiments. For details, refer to the descriptions in the foregoing method embodiments. Details are not described herein again.

Embodiments of this application further provides a processing apparatus, including a processor and an interface. The processor may be configured to perform a method described in the method embodiments.

It should be understood that the processing apparatus may be a chip. For example, the processing apparatus may be a field programmable gate array (FPGA), an application-specific integrated chip (ASIC), a system on chip (SoC), a central processing unit (CPU), a network processor (NP), a digital signal processing circuit (DSP), a microcontroller (micro controller unit, MCU), a programmable controller (programmable logic device, PLD), or another integrated chip.

In an implementation process, steps in the foregoing method can be implemented by using a hardware integrated logic circuit in the processor, or by using instructions in a form of software. Steps of the method disclosed with reference to the embodiments of this application may be directly performed and accomplished by a hardware processor, or may be performed and accomplished by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with the hardware of the processor. To avoid repetition, details are not described herein again.

It should be noted that the processor in the embodiments of this application may be an integrated circuit chip, and has a signal processing capability. In an implementation process, steps in the foregoing method embodiments can be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the method, the steps, and logical block diagrams that are disclosed in the embodiments of this application. The general-purpose processor may be a microprocessor, any conventional processor, or the like. Steps of the method disclosed with reference to the embodiments of this application may be directly performed and accomplished by a hardware decoding processor, or may be performed and accomplished by a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with the hardware of the processor.

It may be understood that the memory in the embodiments of this application may be a volatile memory or a nonvolatile memory, or may include a volatile memory and a nonvolatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memories of the systems and methods described in this specification are intended to include but are not limited to these memories and any memory of another appropriate type.

According to the methods provided in the embodiments of this application, this application further provides a computer program product. The computer program product includes computer program code. When the computer program code is run on a computer, the computer is enabled to perform the method in any one of the embodiments shown in FIG. 4 to FIG. 12.

According to the methods provided in the embodiments of this application, this application further provides a computer-readable medium. The computer-readable medium stores program code. When the program code is run on a computer, the computer is enabled to perform the method in any one of the embodiments shown in FIG. 4 to FIG. 12.

According to the methods provided in the embodiments of this application, this application further provides a system. The system includes the foregoing one or more terminal devices and the foregoing one or more network devices.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (SSD)), or the like.

The network device and the terminal device in the foregoing apparatus embodiments correspond to the network device and the terminal device in the method embodiments. A corresponding module or unit performs a corresponding step. For example, a communications unit (a transceiver) performs a receiving step or a sending step in the method embodiments, and another step other than the sending step and the receiving step may be performed by a processing unit (a processor). For a function of a specific unit, refer to the corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and based on a signal having one or more data packets (for example, data from two components interacting with another component in a local system, in a distributed system, and/or across a network such as the internet interacting with another system by using the signal).

A person of ordinary skill in the art may be aware that, in combination with units and algorithm steps of the examples described in the embodiments disclosed in this specification, this application may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located at one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The software product is stored in a storage medium, and includes several instructions for instructing a computer device (which may be a personal computer, a server, a network device, or the like) to perform all or some of the steps of a method described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A reference signal generation method, comprising:
obtaining a reference signal sequence based on a pseudo-random sequence initial factor $c_{init}$; and
mapping the reference signal sequence to one or more orthogonal frequency-division multiplexing (OFDM) symbols,
wherein:
the pseudo-random sequence initial factor $c_{init}$ is represented by using 31 bits;
10 least significant bits in the 31 bits represent $n_{ID}$ mod 1024;
21 most significant bits in the 31 bits represent $(N_{symb}^{slot} n_{s,f}^{\mu}+l+1)(2(n_{ID} \bmod 1024)+1)$; and
d bits in the 21 most significant bits represent $$\left\lfloor \frac{n_{ID}}{1024} \right\rfloor,$$

and a value of d is related to a maximum value of $n_{ID}$
wherein:
$N_{symb}^{slot}$ represents a quantity of OFDM symbols in a slot,
$\lfloor \ \rfloor$ represents rounding down,
$n_{s,f}^{\mu}$ represents an index of a slot in a frame,
l represents an index of an OFDM symbol in a slot,
$n_{ID}$ represents a reference signal sequence ID,
μ represents a parameter related to a subcarrier spacing, and
mod represents a modulo operation.

2. The method according to claim 1, wherein that $c_{init}$ is represented by using 31 bits comprises:
$c_{init}$ is obtained by first calculating a sum of $n_{ID}$ mod 1024 represented by using the 10 least significant bits, $(N_{symb}^{slot} n_{s,f}^{\mu}+l+1)(2(n_{ID} \bmod 1024)+1)$ represented by using the 21 most significant bits, and $$\left\lfloor \frac{n_{ID}}{1024} \right\rfloor$$

represented by using the d bits, and then performing a modulo operation on the sum by using $2^{31}$.

3. The method according to claim 1, wherein the d bits overlap the 21 most significant bits, and the d bits are located in the middle of the 21 most significant bits.

4. The method according to claim 1, wherein when $n_{ID}$ is less than 4095, a value of d is 2.

5. The method according to claim 1, wherein the pseudo-random sequence initial factor $c_{init}$ satisfies the following formula:

$$C_{init} = \left[2^{31-d}\left\lfloor\frac{n_{ID}}{1024}\right\rfloor + \right.$$
$$\left.(2^{10}(N_{symb}^{slot}n_{s,f}^{\mu} + l + 1)(2(n_{ID} \bmod 1024) + 1) + (n_{ID} \bmod 1024))\right] \bmod 2^{31}.$$

6. A reference signal detection method, comprising:
receiving a reference signal, to obtain a first sequence;
obtaining a second sequence based on a pseudo-random sequence initial factor $c_{init}$; and
performing correlation detection on the first sequence and the second sequence, wherein
the pseudo-random sequence initial factor $c_{init}$ is represented by using 31 bits;
10 least significant bits in the 31 bits represent $n_{ID}$ mod 1024;
21 most significant bits in the 31 bits represent ($N_{symb}^{slot}n_{s,f}^{\mu}+l+1$)(2($n_{ID}$ mod 1024)+1); and
d bits in the 21 most significant bits represent $$\left\lfloor\frac{n_{ID}}{1024}\right\rfloor,$$

and a value of d is related to a maximum value of $n_{ID}$, wherein:
$N_{symb}^{slot}$ represents a quantity of orthogonal frequency-division multiplexing (OFDM) symbols in a slot,
$\lfloor\ \rfloor$ represents rounding down,
$n_{s,f}^{\mu}$ represents an index of a slot in a frame,
l represents an index of an OFDM symbol in a slot,
$n_{ID}$ represents a reference signal sequence ID,
μ represents a parameter related to a subcarrier spacing, and
mod represents a modulo operation.

7. The method according to claim 6, wherein that $c_{init}$ is represented by using 31 bits comprises:
$c_{init}$ is obtained by first calculating a sum of $n_{ID}$ mod 1024 represented by using the 10 least significant bits,
($N_{symb}^{slot}n_{s,f}^{\mu}+l+1$)(2($n_{ID}$ mod 1024)+1) represented by using the 21 most significant bits, and $$\left\lfloor\frac{n_{ID}}{1024}\right\rfloor$$

represented by using the d bits, and then performing a modulo operation on the sum by using $2^{31}$.

8. The method according to claim 6, wherein the d bits overlap the 21 most significant bits, and the d bits are located in the middle of the 21 most significant bits.

9. The method according to claim 6, wherein when $n_{ID}$ is less than 4095, a value of d is 2.

10. The method according to claim 6, wherein the pseudo-random sequence initial factor $c_{init}$ satisfies the following formula:

$$C_{init} = \left[2^{31-d}\left\lfloor\frac{n_{ID}}{1024}\right\rfloor + \right.$$
$$\left.(2^{10}(N_{symb}^{slot}n_{s,f}^{\mu} + l + 1)(2(n_{ID} \bmod 1024) + 1) + (n_{ID} \bmod 1024))\right] \bmod 2^{31}.$$

11. A communications apparatus, comprising at least one processor and a memory coupled with the at least one processor, wherein the at least one processor is configured to:
obtain a reference signal sequence based on a pseudo-random sequence initial factor $c_{init}$; and
map the sequence to one or more orthogonal frequency-division multiplexing (OFDM) symbols,
and wherein:
the pseudo-random sequence initial factor $c_{init}$ is represented by using 31 bits;
10 least significant bits in the 31 bits represent $n_{ID}$ mod 1024;
21 most significant bits in the 31 bits represent ($N_{symb}^{slot}n_{s,f}^{\mu}+l+1$)(2($n_{ID}$ mod 1024)+1); and
d bits in the 21 most significant bits represent $$\left\lfloor\frac{n_{ID}}{1024}\right\rfloor,$$

and a value of d is related to a maximum value of $n_{ID}$, wherein:
$N_{symb}^{slot}$ represents a quantity of OFDM symbols in a slot,
$\lfloor\ \rfloor$ represents rounding down,
$n_{s,f}^{\mu}$ represents an index of a slot in a frame,
l represents an index of an OFDM symbol in a slot,
$n_{ID}$ represents a reference signal sequence ID,
μ represents a parameter related to a subcarrier spacing, and
mod represents a modulo operation.

12. The apparatus according to claim 11, wherein that $c_{init}$ is represented by using 31 bits comprises:
$c_{init}$ is obtained by first calculating a sum of $n_{ID}$ mod 1024 represented by using the 10 least significant bits,
($N_{symb}^{slot}n_{s,f}^{\mu}+l+1$)(2($n_{ID}$ mod 1024)+1) represented by using the 21 most significant bits, and $$\left\lfloor\frac{n_{ID}}{1024}\right\rfloor$$

represented by using the d bits, and then performing a modulo operation on the sum by using $2^{31}$.

13. The apparatus according to claim 11, wherein the d bits overlap the 21 most significant bits, and the d bits are located in the middle of the 21 most significant bits.

14. The apparatus according to claim 11, wherein when $n_{ID}$ is less than 4095, a value of d is 2.

15. The apparatus according to claim 11, wherein the pseudo-random sequence initial factor $c_{init}$ satisfies the following formula:

$$C_{init} = \left[2^{31-d}\left\lfloor\frac{n_{ID}}{1024}\right\rfloor + \right.$$
$$\left.(2^{10}(N_{symb}^{slot}n_{s,f}^{\mu} + l + 1)(2(n_{ID} \bmod 1024) + 1) + (n_{ID} \bmod 1024))\right] \bmod 2^{31}.$$

16. A communications apparatus, comprising at least one processor and a memory coupled with the at least one processor, wherein the at least one processor is configured to:

receive a reference signal;

obtain a first sequence based on the reference signal;

obtain a second sequence based on a pseudo-random sequence initial factor $c_{init}$; and perform correlation detection on the first sequence and the second sequence, wherein:

the pseudo-random sequence initial factor $c_{init}$ is represented by using 31 bits;

10 least significant bits in the 31 bits represent $n_{ID}$ mod 1024;

21 most significant bits in the 31 bits represent $(N_{symb}^{slot}n_{s,f}^{\mu}+l+1)(2(n_{ID} \bmod 1024)+1)$; and d bits in the 21 most significant bits represent $$\left\lfloor \frac{n_{ID}}{1024} \right\rfloor,$$

and a value of d is related to a maximum value of $n_{ID}$, wherein:

$N_{symb}^{slot}$ represents a quantity of orthogonal frequency-division multiplexing (OFDM) symbols in a slot, $\lfloor \ \rfloor$ represents rounding down, $n_{s,f}^{\mu}$ represents an index of a slot in a frame, l represents an index of an OFDM symbol in a slot, $n_{ID}$ represents a reference signal sequence ID, μ represents a parameter related to a subcarrier spacing, and mod represents a modulo operation.

17. The apparatus according to claim 16, wherein that $c_{init}$ is represented by using 31 bits comprises:

$c_{init}$ is obtained by first calculating a sum of $N_{ID}$ mod 1024 represented by using the 10 least significant bits, $(N_{symb}^{slot}n_{s,f}^{\mu}+l+1)(2(n_{ID} \bmod 1024)+1)$ represented by using the 21 most significant bits, and $$\left\lfloor \frac{n_{ID}}{1024} \right\rfloor$$

represented by using the d bits, and then performing a modulo operation on the sum by using $2^{31}$.

18. The apparatus according to claim 16, wherein the d bits overlap the 21 most significant bits, and the d bits are located in the middle of the 21 most significant bits.

19. The apparatus according to claim 16, wherein when $n_{ID}$ is less than 4095, a value of d is 2.

20. The apparatus according to claim 16, wherein the pseudo-random sequence initial factor $c_{init}$ satisfies the following formula:

$$C_{init} = \left[ 2^{31-d} \left\lfloor \frac{n_{ID}}{1024} \right\rfloor + \left( 2^{10}(N_{symb}^{slot}n_{s,f}^{\mu}+l+1)(2(n_{ID} \bmod 1024)+1) + (n_{ID} \bmod 1024) \right) \right] \bmod 2^{31}.$$

* * * * *

UNITED STATES PATENT AND TRADEMARK OFFICE
CERTIFICATE OF CORRECTION

PATENT NO. : 11,637,729 B2
APPLICATION NO. : 17/511916
DATED : April 25, 2023
INVENTOR(S) : Zhenyu Shi et al.

Page 1 of 1

It is certified that error appears in the above-identified patent and that said Letters Patent is hereby corrected as shown below:

In the Claims

In Column 44, Line 45, in Claim 1, delete "$n_{ID}$" and insert -- $n_{ID}$, --.

In Column 47, Line 26, in Claim 16, delete "$AT N_{symb}^{slot\,slot}$" and insert -- $N_{symb}^{slot}$ --.

Signed and Sealed this
Thirteenth Day of June, 2023

*Katherine Kelly Vidal*
Katherine Kelly Vidal
*Director of the United States Patent and Trademark Office*